(12) United States Patent
Sugatani

(10) Patent No.: US 9,896,847 B2
(45) Date of Patent: Feb. 20, 2018

(54) METHOD OF INSTALLING EXHAUST TUBE

(71) Applicant: NORITZ CORPORATION, Hyogo (JP)

(72) Inventor: Masaki Sugatani, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 755 days.

(21) Appl. No.: 14/475,351

(22) Filed: Sep. 2, 2014

(65) Prior Publication Data

US 2016/0060873 A1 Mar. 3, 2016

(51) Int. Cl.
*F16L 55/13* (2006.01)
*F16L 55/12* (2006.01)
(Continued)

(52) U.S. Cl.
CPC ............ *E04D 13/178* (2013.01); *F16L 11/15* (2013.01); *F23J 11/00* (2013.01); *F16L 55/11* (2013.01); *F16L 55/115* (2013.01); *F16L 55/1141* (2013.01); *F16L 55/1286* (2013.01); *F16L 55/13* (2013.01); *F16L 55/1652* (2013.01); *F16L 57/005* (2013.01); *F16L 59/121* (2013.01); *F16L 59/123* (2013.01); *F16L 59/13* (2013.01); *F16L 2101/18* (2013.01); *F16L 2101/20* (2013.01); *F23J 2213/60* (2013.01); *Y10T 29/49732* (2015.01)

(58) Field of Classification Search
CPC ...... E04D 13/178; F23J 11/00; F23J 2213/60; F16L 11/15; F16L 59/121; F16L 59/123; F16L 59/13; F16L 2101/18; F16L 2101/20; F16L 55/1652; F16L 55/1141; F16L 55/115; F16L 55/13; F16L 55/1286; F16L 57/005; F16L 55/18; F16L 55/165; Y10T 29/49732; B21D 39/00; B25H 7/005

USPC ........................................................ 29/401.1
See application file for complete search history.

(56) References Cited

U.S. PATENT DOCUMENTS 3,522,767 A * 8/1970 Derringer ................ F23J 11/00
110/184
3,821,969 A * 7/1974 Sinko ..................... B65D 59/02
138/89

(Continued)

FOREIGN PATENT DOCUMENTS

JP 2002188755 A * 7/2002 ................ F16L 1/00
JP 2007-155178 A 6/2007

OTHER PUBLICATIONS

JP 2002188755, Tanaka, Piping Lining Method and Traction Jig, EPO Machine Translation, pp. 1-6, Mar. 6, 2017.*

Primary Examiner — Bayan Salone
(74) Attorney, Agent, or Firm — Studebaker & Brackett PC

(57) ABSTRACT

A method of installing an exhaust tube is implemented by inserting an exhaust tube into an exhaust pipe that leads from the inside of a building to the outside thereof. Utilizing an already-placed exhaust pipe, a new exhaust tube is inserted into this exhaust pipe. The exhaust tube is installed according to a procedure of: performing, on the inside of the building, an operation of inserting a new exhaust tube into the already-placed exhaust pipe; performing, on the outside of the building, an operation of fixing the inserted exhaust tube to the exhaust pipe; and performing, on the inside of the building, an operation of connecting the fixed exhaust tube to an exhaust vent of a combustion apparatus.

10 Claims, 31 Drawing Sheets

(51) Int. Cl.
  *F16L 55/16* (2006.01)
  *F16L 55/18* (2006.01)
  *F16L 55/11* (2006.01)
  *F16L 57/00* (2006.01)
  *F16L 59/12* (2006.01)
  *F16L 59/13* (2006.01)
  *F16L 11/15* (2006.01)
  *F23J 11/00* (2006.01)
  *E04D 13/17* (2006.01)
  *B25H 7/00* (2006.01)
  *B21D 39/00* (2006.01)
  *F16L 55/165* (2006.01)
  *F16L 101/18* (2006.01)
  *F16L 101/20* (2006.01)
  *F16L 55/128* (2006.01)
  *F16L 55/115* (2006.01)

(56) References Cited

U.S. PATENT DOCUMENTS

| | | | | |
|---|---|---|---|---|
| 4,115,961 A * | 9/1978 | Bishop | ............ | E04D 13/14 285/42 |
| 4,608,963 A * | 9/1986 | Townsend | ............ | F23J 13/025 126/307 R |
| 5,165,732 A * | 11/1992 | Townsend | ............ | F16L 13/163 126/307 R |
| 5,222,906 A * | 6/1993 | Lundstrom | ............ | B08B 15/002 454/64 |
| 5,393,260 A * | 2/1995 | Barth | ............ | F16L 9/18 138/114 |
| 6,076,862 A * | 6/2000 | Barth | ............ | F16L 39/005 138/148 |
| 6,234,163 B1 * | 5/2001 | Garrod | ............ | F16L 11/20 126/307 R |
| 7,971,560 B2 * | 7/2011 | Gordon | ............ | F24H 1/205 122/15.1 |
| 8,413,689 B1 * | 4/2013 | Taylor | ............ | F16L 55/11 138/89 |
| 8,833,398 B2 * | 9/2014 | Williams | ............ | F16L 55/11 138/89 |
| 8,984,822 B1 * | 3/2015 | Cline | ............ | E04D 13/14 52/244 |
| 9,341,368 B2 * | 5/2016 | Sugatani | ............ | F23J 13/025 |
| 2005/0047922 A1 * | 3/2005 | Brown | ............ | F23L 17/005 417/22 |
| 2009/0235875 A1 * | 9/2009 | Gordon | ............ | F24H 1/205 122/13.01 |
| 2012/0192980 A1 * | 8/2012 | Williams | ............ | F16L 55/11 138/89 |
| 2016/0053995 A1 * | 2/2016 | Sugatani | ............ | F23J 13/025 29/401.1 |
| 2016/0059406 A1 * | 3/2016 | Nagano | ............ | F16L 55/165 29/426.2 |

\* cited by examiner

FIG.24
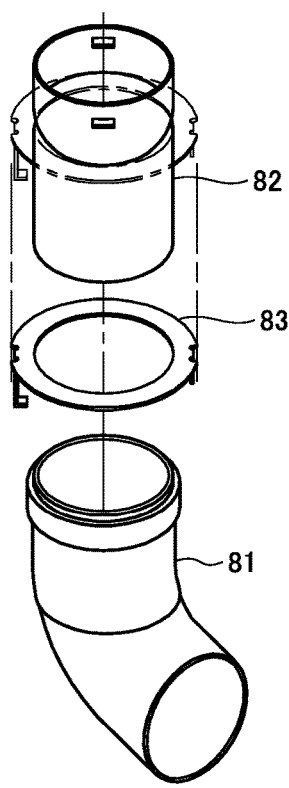
(a)
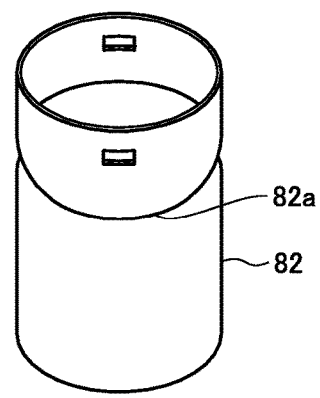
(b)

FIG.32
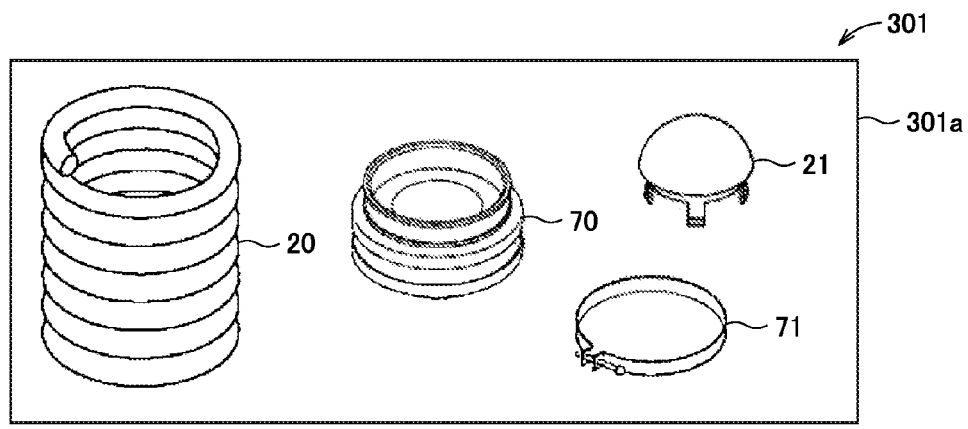
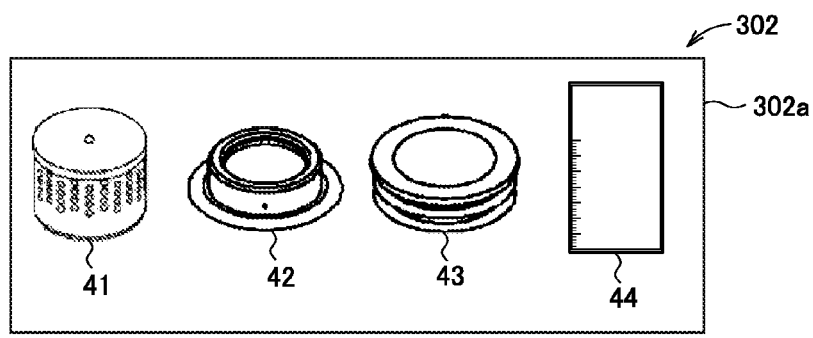
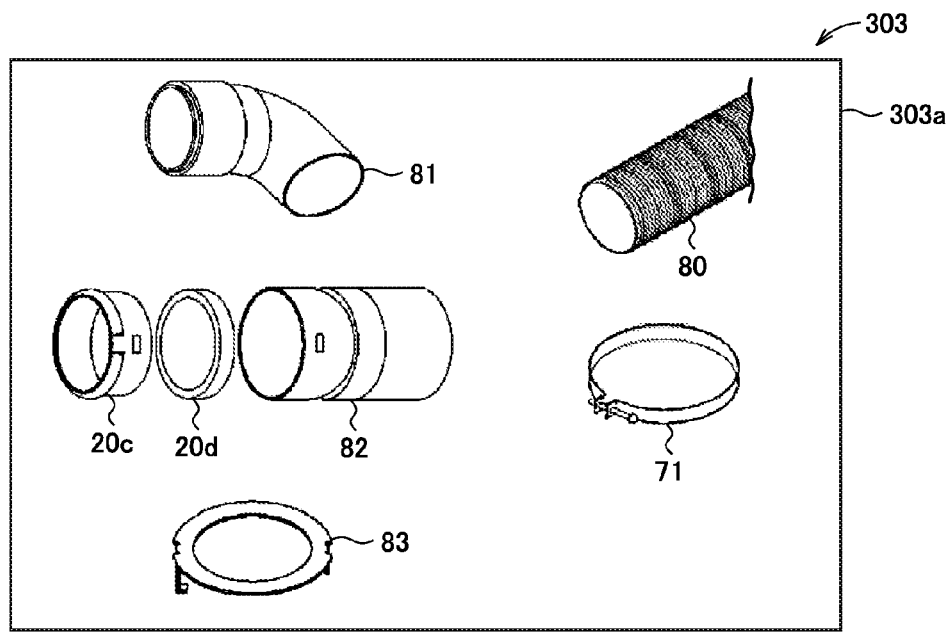

FIG.33
(a)
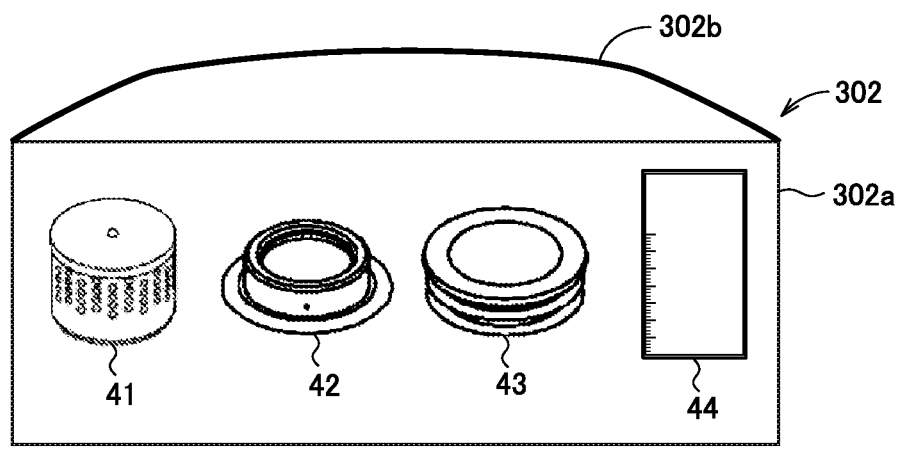
(b)
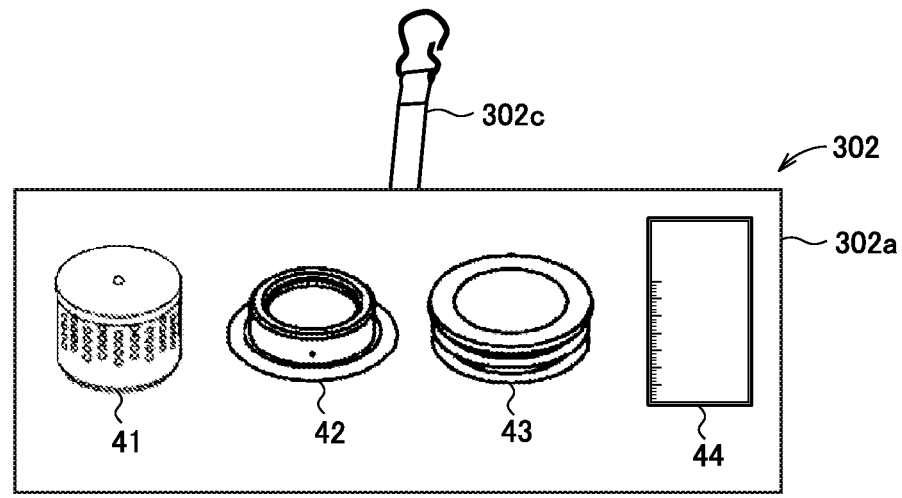

METHOD OF INSTALLING EXHAUST TUBE

BACKGROUND OF THE INVENTION

Field of the Invention

The present invention relates to a method of installing an exhaust tube (a flexible exhaust tube), and particularly to a method of installing a new exhaust tube in an already-placed exhaust pipe (a B vent).

Description of the Background Art

Under the current circumstances, there are markets where a hot water storage-type water heater (a tank-type water heater) is placed inside a building. In such a market, there exists a demand for replacing a hot water storage-type water heater with an instantaneous water heater (a tankless water heater) that is excellent in fuel efficiency and space saving performance.

Conventionally, when a hot water storage-type water heater is replaced with an instantaneous water heater, it is necessary to perform an operation of providing a new hole in a wall or a roof of a building and inserting an exhaust tube for an instantaneous water heater into this hole. As a result, the time required for installing the exhaust tube is prolonged.

SUMMARY OF THE INVENTION

The present invention has been made in light of the above-described problems. An object of the present invention is to provide a method of installing an exhaust tube by which an operation can be completed by a small number of operators in a short period of time, an installation member set used in this method, a method of placing a combustion apparatus, and a method of replacing a water heater.

A method of installing an exhaust tube of the present invention is a method of installing an exhaust tube through which combustion gas produced in a combustion apparatus placed on an inside of a building is emitted to an outside of the building. The method includes the steps of: by an operation on the inside of the building, inserting, from the inside of the building toward the outside thereof, an exhaust tube into an exhaust pipe already placed and leading from the inside of the building to the outside thereof (the first inside step); by an operation on the outside of the building, fitting an exhaust adapter having an annular shape into a gap between an outer circumferential surface of the exhaust tube and an inner circumferential surface of the exhaust pipe to close a gap and fix the exhaust tube to the exhaust pipe (the outside step); and, by an operation on the inside of the building, connecting a rear end portion of the exhaust tube and an exhaust vent of the combustion apparatus (the second inside step). The steps described above are performed in this order.

In the method of installing an exhaust tube according to the present invention, the exhaust tube is installed utilizing an already-placed exhaust pipe by inserting a new exhaust tube into this exhaust pipe. This eliminates the need to provide a hole in a building, so that the exhaust tube can be installed by a small number of operators in a short period of time.

Furthermore, in the method of installing an exhaust tube according to the present invention, the exhaust tube is installed according to the procedure of: on the inside of the building, performing an operation of inserting a new exhaust tube into an already-placed exhaust pipe; on the outside of the building, performing an operation of fixing the inserted exhaust tube to the exhaust pipe; and, on the inside of the building, performing an operation of connecting the fixed exhaust tube to the exhaust vent of the combustion apparatus. Furthermore, the first inside step further includes, after the step of inserting the exhaust tube into the exhaust pipe, the step of temporarily fixing the exhaust tube to the exhaust pipe by a fixing member so as to prevent the exhaust tube from slipping down by a self weight. If the exhaust tube slips down before the exhaust tube is fixed to the exhaust pipe in the outside step, it becomes necessary to again perform an operation of pushing up the exhaust tube on the inside of the building, thereby increasing the operation time and also making it difficult for a single operator to perform the operation. Accordingly, by temporarily fixing the exhaust tube so as not to slip down, it becomes possible to suppress an increase in the operation time and allow a single operator to easily perform the operation.

Furthermore, in the step of temporarily fixing the exhaust tube, the exhaust tube is temporarily fixed by the fixing member such that the exhaust tube can be moved relative to the exhaust pipe when a prescribed amount or more of external force is applied. In the case where the exhaust tube is temporarily fixed so as not to be moved relative to the exhaust pipe, if the tip end portion of the exhaust tube does not protrude from an outside end portion of the exhaust pipe located on the outside of the building in the outside step or if the length of the exhaust tube protruding from the exhaust pipe is insufficient in the outside step, the operator is required to go back into the building again to disengage the exhaust tube and push up this exhaust tube. Consequently, the operation time is to be prolonged. Accordingly, by temporarily fixing the exhaust tube such that the exhaust tube can be moved relative to the exhaust pipe, the operator does not have to go back into the building, but pulls up the exhaust tube from the outside of the building, so that the tip end portion of the exhaust tube can be set at an appropriate position.

Furthermore, in the method of installing an exhaust tube according to the present invention, in the step of inserting the exhaust tube into the exhaust pipe, the exhaust tube is inserted into the exhaust pipe until a tip end portion of the exhaust tube reaches the outside of the building. Accordingly, the operator does not have to go back into the building, but pulls up the exhaust tube from the outside of the building, so that the tip end portion of the exhaust tube can be set at an appropriate position.

Furthermore, in the method of installing an exhaust tube according to the present invention, the first inside step further includes the step of attaching an insertion jig to the tip end portion of the exhaust tube before the step of inserting the exhaust tube into the exhaust pipe. The insertion jig has a protruding portion curved convexly. In a state where the insertion jig is attached to the exhaust tube, the protruding portion protrudes to a side opposite to the exhaust tube and covers an opening at the tip end portion of the exhaust tube. Accordingly, when the insertion jig is fixed to the exhaust tube and inserted into the exhaust pipe, the tip end portion of the exhaust tube is less likely to get caught in the inner circumferential surface of the exhaust pipe, so that the frictional resistance between the insertion jig and the inner circumferential surface of the exhaust pipe can be reduced. Consequently, the exhaust tube having the insertion jig fixed thereto can be smoothly pushed into the exhaust pipe. Therefore, the exhaust tube can be readily inserted into the exhaust pipe. Furthermore, since the protruding portion of the insertion jig covers the opening at the tip end portion of the exhaust tube, entry of foreign substances into the exhaust tube through the opening at the tip end portion of the exhaust tube can be suppressed.

Furthermore, in the method of installing an exhaust tube according to the present invention, before the first inside step, an outside end portion of the exhaust pipe located on the outside of the building is provided with an exhaust terminal (a rain cap) including at least an exhaust port through which the combustion gas is emitted to outside, and a ceiling wall. Accordingly, the combustion gas guided through the exhaust tube can be emitted through the exhaust port of the exhaust terminal to the outside of the building, and entry of rainwater and the like into the combustion apparatus through the exhaust tube can be prevented.

Furthermore, in the case where the exhaust terminal is attached to the exhaust pipe, the outside step further includes the steps of: removing the exhaust terminal from the exhaust pipe before the step of fixing the exhaust tube; and attaching the exhaust terminal to the outside end portion of the exhaust pipe after the step of fixing the exhaust tube. Accordingly, the operation of fixing the exhaust tube to the outside end portion of the exhaust pipe, the operation of adjusting the position of the tip end portion of the exhaust tube, and the like can be performed in the outside step.

In this case, the outside step further includes, after the step of removing the exhaust terminal and before the step of attaching the exhaust terminal, the step of adjusting a length of the exhaust tube protruding from the outside end portion of the exhaust pipe so as to fit to a shape of the exhaust terminal. Accordingly, the length of the exhaust tube protruding from the exhaust pipe can be optimized in accordance with exhaust terminals having various shapes for each type. Therefore, it becomes possible to suppress defects such as an increase in exhaust resistance occurring in the case where the tip end portion of the exhaust tube is not set at an appropriate position.

Furthermore, in the case where the exhaust terminal is attached to the exhaust pipe, the outside step further includes, after the step of fixing the exhaust tube, the step of attaching, to the tip end portion of the exhaust tube, an exhaust straightening member including a circumferential wall portion having a cylindrical shape and a plurality of openings through which the combustion gas flows out toward the exhaust port of the exhaust terminal, and a cover portion that closes one end of the circumferential wall portion. By causing the combustion gas to flow out through the plurality of openings provided in the circumferential wall portion of the exhaust straightening member, the combustion gas can be readily emitted through the exhaust port of the exhaust terminal. Furthermore, since the one end of the circumferential wall portion of the exhaust straightening member is closed by the cover portion, the combustion gas is less likely to come into contact with the ceiling wall of the exhaust terminal. Therefore, it becomes possible to suppress occurrence of dew condensation and drainage water produced when combustion gas comes into contact with the ceiling wall of the exhaust terminal. In addition, the exhaust straightening member is disposed within the exhaust terminal. Accordingly, even if combustion gas comes into contact with the cover portion of the exhaust straightening member, production of drainage water is suppressed as compared with the case where combustion gas comes into contact with the ceiling wall of the exhaust terminal.

Furthermore, in the method of installing an exhaust tube described above, the second inside step further includes, before the step of connecting the rear end portion of the exhaust tube and the exhaust vent of the combustion apparatus, the step of adjusting a length of the exhaust tube protruding from an inside end portion of the exhaust pipe located on the inside of the building in accordance with a distance between the inside end portion of the exhaust pipe and the exhaust vent of the combustion apparatus. Accordingly, it becomes possible to suppress defects such as an increase in exhaust resistance caused by accumulation of drainage water and the like resulting from slack in the exhaust tube.

Furthermore, in the method of installing an exhaust tube described above, the second inside step further includes the step of attaching a protection tube for protecting at least a part of the exhaust tube extending from the exhaust pipe to the combustion apparatus. Accordingly, damage to the exhaust tube protruding from the inside end portion of the exhaust pipe can be suppressed and, even if the exhaust tube is broken, leakage of combustion gas into the building and dripping of drainage water and the like into the building can also be suppressed.

The protection tube can expand and contract in an axial direction. The second inside step further includes the step of adjusting a length of the protection tube by causing the protection tube to expand or contract in accordance with a distance between the exhaust pipe and the combustion apparatus. Accordingly, the length of the protection tube can readily be adjusted in accordance with the length of the exhaust tube protruding from the inside end portion of the exhaust pipe.

Furthermore, in the method of installing an exhaust tube described above, the combustion apparatus includes a burner producing combustion gas and a fan that supplies air to the burner. The second inside step further includes, after the step of connecting the rear end portion of the exhaust tube and the exhaust vent of the combustion apparatus, the step of changing setting of an air-blowing capability of the fan in accordance with a length of the exhaust tube. By achieving appropriate setting of the air-blowing capability of the fan in accordance with the length of the exhaust tube, it becomes possible to optimize the amount of air and fuel gas supplied into the combustion apparatus and the exhaust amount of combustion gas. Accordingly, it becomes possible to suppress faulty combustion caused by excess or deficiency of the supplied amount of air and fuel gas and of the exhaust amount of combustion gas, so that the combustion efficiency can be improved.

Furthermore, the present invention provides an installation member set including a plurality of installation members used in the method of installing an exhaust tube described above, and also relates to the installation member set including: a first member set having a first package and the installation members housed in the first package and used in the first inside step; a second member set having a second package and the installation members housed in the second package and used in the outside step; and a third member set having a third package and the installation members housed in the third package and used in the second inside step.

According to the installation member set of the present invention, in the method of installing an exhaust tube described above, the installation members used in each step can be readily prepared, and the exhaust tube can be installed in a shorter period of time.

The second package has a holding member for allowing the second member set to be held in a state where both hands of an operator can be used in the outside step. Accordingly, in the outside step performed on a high place such as on the top of a roof, accidental dropping of the installation member by the operator can be suppressed without impairing safety and working efficiency. Consequently, the operation of collecting the dropped installation member can be eliminated, so that the exhaust tube can be installed in a shorter period of time.

Furthermore, the present invention also relates to a method of placing a combustion apparatus, including the steps of: installing an exhaust tube using the method of installing an exhaust tube described above; and placing the combustion apparatus on the inside of the building. In the method of placing a combustion apparatus of the present invention, the combustion apparatus can be placed by a small number of operators in a short period of time by using the method of installing an exhaust tube described above.

Furthermore, the present invention provides a method of replacing a water heater using the method of installing an exhaust tube described above, and also relates to a method of replacing a water heater, including the steps of: removing a hot water storage-type water heater placed on the inside of the building; installing the exhaust tube; and placing the combustion apparatus on the inside of the building. The combustion apparatus is an instantaneous water heater. According to the method of replacing a water heater of the present invention, the water heater can be replaced in a short period of time by means of a small number of operators by using the method of installing an exhaust tube described above.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 24 is another schematic diagram for illustrating the operation step in the method of installing an exhaust tube, and the like, in one embodiment of the present invention.

FIG. 32 is a schematic diagram showing an installation member set used in the method of installing an exhaust tube in one embodiment of the present invention.

FIG. 33 is a schematic diagram showing a modification of the installation member set used in the method of installing an exhaust tube in one embodiment of the present invention.

DESCRIPTION OF THE PREFERRED EMBODIMENTS

The embodiments of the present invention will be hereinafter described with reference to the accompanying drawings.

The outline of the state of a building in which an exhaust tube is installed and a combustion apparatus is placed will be first described before describing each step in the method of installing an exhaust tube and the like in one embodiment of the present invention.

Figure 1:
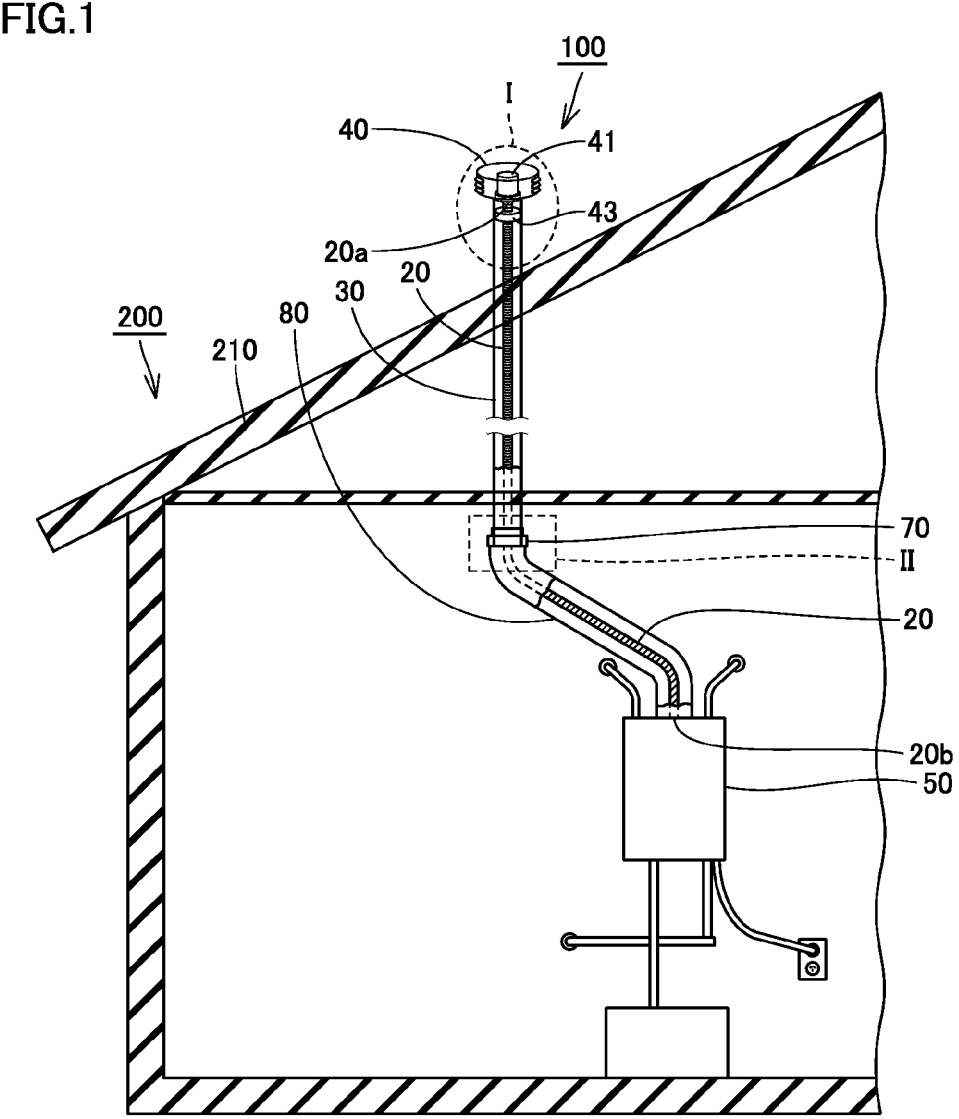
FIG. 1 is a diagram schematically showing the state of a building in which an exhaust tube is installed and a combustion apparatus is placed, in one embodiment of the present invention.

Mainly referring to FIG. 1, an exhaust structure for combustion apparatus 100 mainly has an exhaust tube 20, an exhaust pipe 30, an exhaust terminal 40, an exhaust straightening member (a diffuser) 41, an exhaust adapter 43, a fixing member 70, a protection tube 80, and a combustion apparatus 50. This exhaust structure for combustion apparatus 100 serves to emit combustion gas produced in combustion apparatus 50 to the outside of a building 200.

Combustion apparatus 50 is placed inside building 200. This combustion apparatus 50 serves as a water heater that heats warm water and water, for example, with combustion gas, and may be a heating apparatus or the like that warms up the inside of the building with combustion gas.

Figure 6:
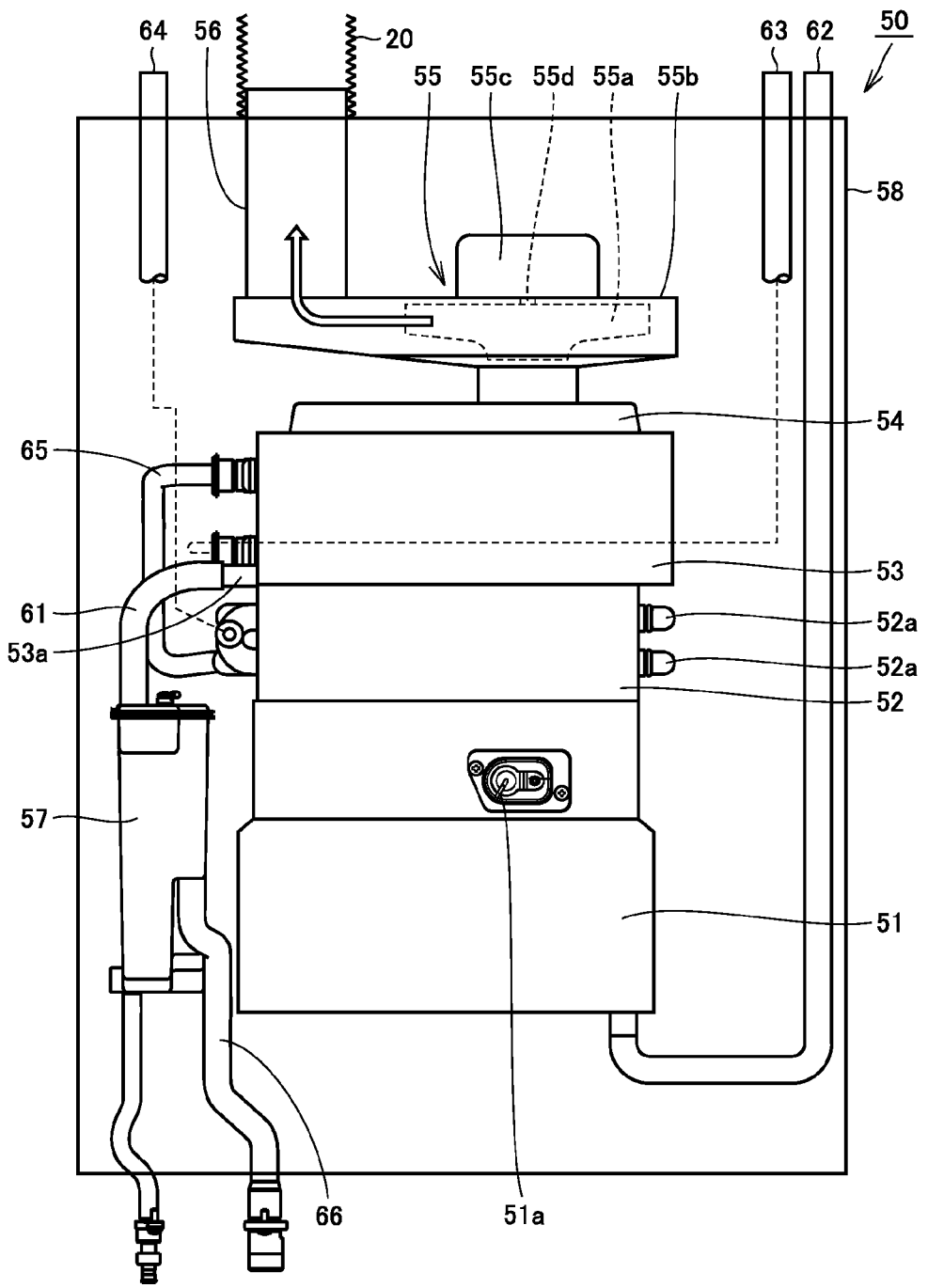
FIG. 6 is a front view schematically showing the configuration of a water heater as an example of the combustion apparatus in one embodiment of the present invention.
Figure 7:
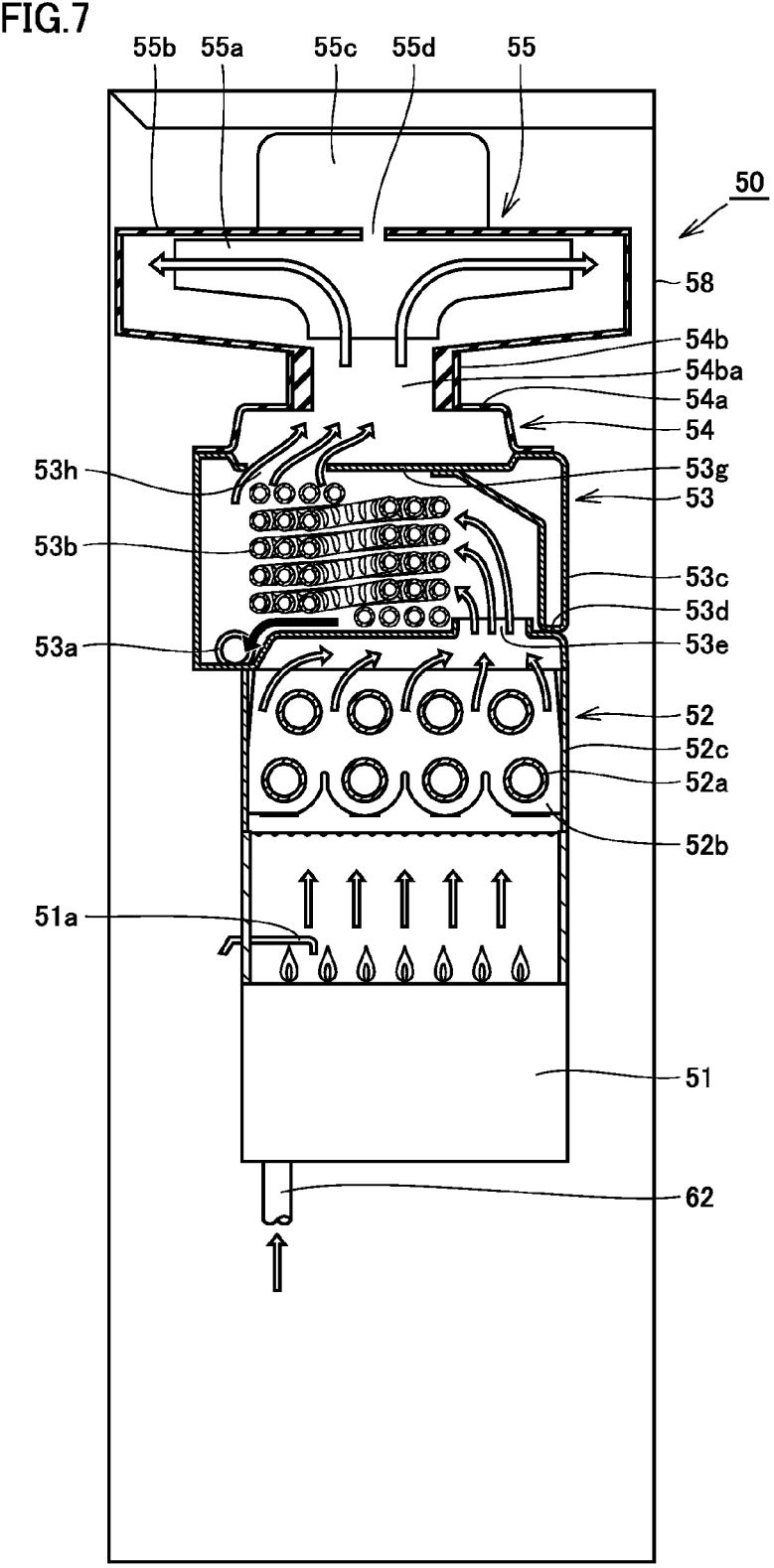
FIG. 7 is a partial cross-sectional side view schematically showing the configuration of the water heater shown in FIG. 6.

The water heater is an instantaneous water heater (a tankless water heater). An instantaneous water heater serves as an apparatus that instantaneously heats warm water and water flowing through a heat conduction pipe and supplies hot water. As compared with a hot water storage-type water heater (that heats water stored in a hot water storage tank to a set temperature and supplies hot water), the instantaneous water heater is excellent in fuel efficiency since it heats water by an amount required for each use, and also excellent in space saving performance since it does not have a hot water storage tank. The instantaneous water heater may be a water heater of a latent heat recovery type adapted to an exhaust suction and combustion system, for example, as shown in FIGS. 6 and 7, or may be a water heater of a latent heat recovery type adapted to an exhaust pushing system.

Exhaust tube 20 has a tip end portion 20a and a rear end portion 20b. Tip end portion 20a of exhaust tube 20 extends to the outside of the building and rear end portion 20b thereof is connected to combustion apparatus 50. The inside of exhaust tube 20 is defined as an emission path for the combustion gas emitted from combustion apparatus 50. Thus, the combustion gas produced in combustion apparatus 50 can be guided to the outside of the building through exhaust tube 20.

Exhaust tube 20 is formed of a flexible tube made of resin. Specifically, exhaust tube 20 is implemented as a flexible pipe such as an accordion pipe, but may be a spiral pipe and the like. In this case, exhaust tube 20 can fit the shape thereof to exhaust pipe 30 having a complicated shape. Furthermore, since an exhaust flows through exhaust tube 20, this exhaust tube 20 can be suitably made of a material having acidic resistance. This is because acidic drainage water may be discharged together with an exhaust in the case where combustion apparatus 50 is a water heater of a latent heat recovery type as in the present embodiment.

Accordingly, exhaust tube 20 can be made of a material having acidic resistance such as phenol resin, epoxy resin, silicone resin, fluorine resin such as polytetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin, for example.

Exhaust pipe 30 is attached to building 200 so as to extend from the inside to the outside, for example, through a roof 210 of building 200. Exhaust pipe 30 may extend from the inside of the building to the outside thereof through a wall. Exhaust pipe 30 is greater in outer diameter than exhaust tube 20. In the inside of this exhaust pipe 30, a part of exhaust tube 20 on the side of tip end portion 20a is inserted. Exhaust pipe 30 is formed of metal, for example.

Figure 2:
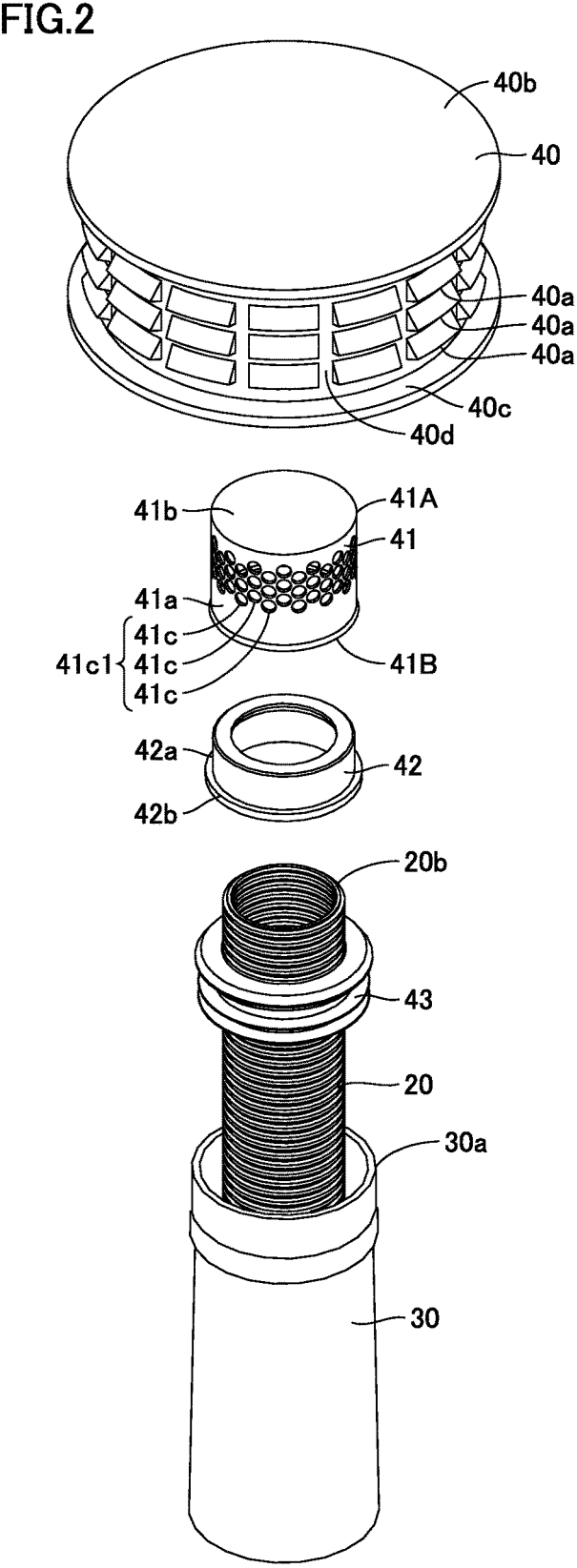
FIG. 2 is an exploded perspective view showing, in an enlarged manner, a region I in FIG. 1.

Then, a region I in FIG. 1 will be described mainly with reference to FIGS. 2 and 3. Exhaust terminal (a rain cap) 40 is attached to an end of exhaust pipe 30 on the outside of the building (an outside end portion 30a). This exhaust terminal 40 has a ceiling wall 40b, a bottom wall 40c, a circumferential wall 40d, and a connection pipe portion 40e. Ceiling wall 40b is attached to an upper end of circumferential wall 40d, and bottom wall 40c is attached to a lower end of circumferential wall 40d. Connection pipe portion 40e has a cylindrical shape and is attached to bottom wall 40c so as to penetrate bottom wall 40c. In circumferential wall 40d, an exhaust port 40a for exhausting the combustion gas to the outside (outdoors) is formed. This exhaust port 40a allows the combustion gas guided through exhaust tube 20 to be exhausted from exhaust terminal 40 to the outside of building 200 through exhaust pipe 30.

Connection pipe portion 40e of exhaust terminal 40 is connected to exhaust pipe 30. This connection pipe portion 40e may be an outer cover attached on an outer circumferential side of exhaust pipe 30 or an inner cover attached on an inner circumferential side of exhaust pipe 30. Exhaust terminal 40 is made, for example, of such a material as aluminum or stainless steel.

Exhaust adapter 43 serves to fix exhaust tube 20 to exhaust pipe 30. Exhaust adapter 43 has an annular shape that surrounds a through hole. By inserting exhaust tube 20 into the through hole, exhaust adapter 43 is attached to the outer circumferential surface of exhaust tube 20 and also to the inner circumferential surface of exhaust pipe 30. Specifically, this exhaust adapter 43 is fitted on the outer circumferential surface of exhaust tube 20 and fitted on the inner circumferential surface of exhaust pipe 30. Exhaust adapter 43 has an inner circumferential surface that presses the outer circumferential surface of exhaust tube 20 in the state where this exhaust adapter 43 is fitted on the outer circumferential surface of exhaust tube 20; and an outer circumferential surface that presses the inner circumferential surface of exhaust pipe 30 in the state where exhaust adapter 43 is fitted on the inner circumferential surface of exhaust pipe 30.

Consequently, the inner circumferential surface of exhaust adapter 43 comes into close contact with the outer circumferential surface of exhaust tube 20 while the outer circumferential surface of exhaust adapter 43 comes into close contact with the inner circumferential surface of exhaust pipe 30. Accordingly, exhaust adapter 43 can firmly fix exhaust tube 20 to exhaust pipe 30, and also, can prevent combustion gas or drainage water and rainwater from leaking through between exhaust tube 20 and exhaust pipe 30 and flowing back into the building.

The above-described configuration can be readily achieved, for example, by exhaust adapter 43 made of an elastic material. This elastic material is for example preferably a soft resin, or for example preferably EPDM (Ethylene-Propylene-Diene Monomer), soft PVC (polyvinyl chloride), silicone rubber, fluororubber, chloroprene rubber (CR), butyl rubber (IIR), or the like. Furthermore, exhaust adapter 43 may be made of one type elastic material, or may be made of a combination of a plurality of different types of elastic materials.

Connection member (diffuser gasket) 42 serves to attach exhaust straightening member 41 to tip end portion 20a of exhaust tube 20 and is made of a material having elasticity. This connection member 42 has a cylindrical portion 42a and an annular portion 42b. Annular portion 42b is attached to an end portion of cylindrical portion 42a and formed to project toward the outer circumference relative to cylindrical portion 42a. A through hole is formed so as to penetrate both of cylindrical portion 42a and annular portion 42b. As exhaust tube 20 is inserted in the through hole, connection member 42 is fitted on the outer circumferential surface of exhaust tube 20.

Exhaust straightening member 41 is fitted, for example, on the outer circumferential surface of connection member 42. As connection member 42 is fitted to exhaust tube 20 and exhaust straightening member 41 is fitted to connection member 42, exhaust straightening member 41 is attached to tip end portion 20a of exhaust tube 20. This exhaust straightening member 41 has a circumferential wall portion 41a and a cover portion 41b. The circumferential wall portion has a cylindrical shape having one end 41A and the other end 41B. Cover portion 41b is attached to one end of circumferential wall portion 41a so as to close one end 41A of circumferential wall portion 41a. The other end 41B of circumferential wall portion 41a is fitted on the outer circumferential surface of connection member 42 as far as a position where it abuts to annular portion 42b projecting toward the outer circumference relative to cylindrical portion 42a of connection member 42.

In circumferential wall portion 41a, an opening portion 41c1 for allowing the combustion gas to flow out toward exhaust port 40a of exhaust terminal 40 is formed. This opening portion 41c1 is constituted of a plurality of openings 41c that are arranged at a distance from one another. Each of the plurality of openings 41c is implemented as a through hole in a shape, for example, of a circle (a perfect circle, an enclosed track shape, or an ellipse), but the shape is not limited as such and the opening may be implemented as a through hole in a polygonal shape such as a triangular shape and a rectangular shape, or a through hole in any shape. Exhaust straightening member 41 is made, for example, of such a material as stainless steel.

Then, a region II in FIG. 1 will be described mainly with reference to FIGS. 4 and 5. Fixing member 70 serves to fix exhaust tube 20 to exhaust pipe 30. Fixing member 70 fixes exhaust tube 20 to exhaust pipe 30 in the state where it is attached to the outer circumferential surface of exhaust tube 20. Fixing member 70 is attached to the outer circumferential surface of an inside end portion 30b (an end portion of exhaust pipe 30 located on the inside of the building) of exhaust pipe 30. Furthermore, fixing member 70 fixes protection tube 80 to exhaust pipe 30.

Fixing member 70 is formed of an elastic body. This elastic body is for example preferably made of a soft resin, or for example preferably EPDM (Ethylene-Propylene-Diene Monomer), soft PVC (polyvinyl chloride), silicone rubber, fluororubber, chloroprene rubber (CR), butyl rubber (IIR), or the like. Furthermore, fixing member 70 may be made of one type elastic material, or may be made of a combination of a plurality of different types of elastic materials.

Figure 5:
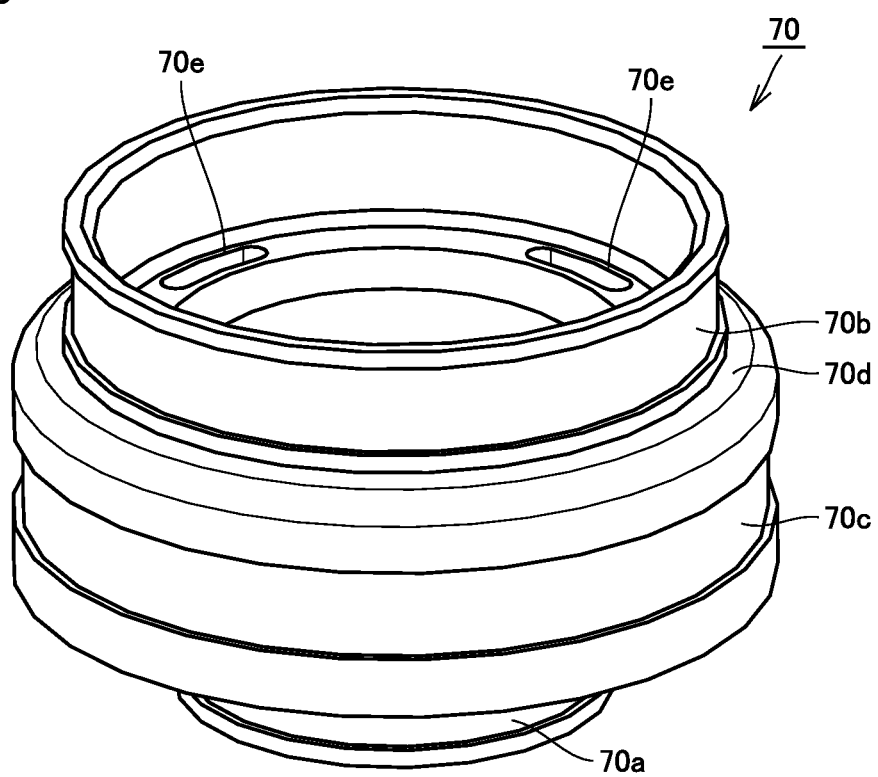
FIG. 5 is a perspective view schematically showing the configuration of a fixing member in one embodiment of the present invention.

Mainly referring to FIG. 5, fixing member 70 is formed in a tubular shape. Fixing member 70 mainly has a first fixing portion 70a, a second fixing portion 70b, a third fixing portion 70c, and a main body portion 70d.

First fixing portion 70a is formed in a tubular shape. Specifically, first fixing portion 70a has a cylindrical tubular shape. First fixing portion 70a extends from main body portion 70d toward combustion apparatus 50 shown in FIG. 1. It is to be noted that first fixing portion 70a may extend from main body portion 70d toward exhaust terminal 40 shown in FIG. 1.

First fixing portion 70a is connected to exhaust tube 20. Specifically, exhaust tube 20 is inserted into a cylindrical through hole of first fixing portion 70a, and the inner circumferential surface of first fixing portion 70a is in contact with the outer circumferential surface of exhaust tube 20. In other words, first fixing portion 70a is fitted around exhaust tube 20. First fixing portion 70a is formed to have an inner diameter smaller than the outer diameter of exhaust tube 20, thereby allowing exhaust tube 20 to be fixed with the elastic force of first fixing portion 70a. In the present embodiment, a binding band 71 is tightened to squeeze the outer circumferential surface of first fixing portion 70a, so that the inner circumferential surface of first fixing portion 70a is brought firmly into contact with the outer circumferential surface of exhaust tube 20. Thereby, exhaust tube 20 can be firmly fixed (fixed in a full-scale manner) by first fixing portion 70a.

Second fixing portion 70b is formed in a tubular shape. Specifically, second fixing portion 70b has a cylindrical tubular shape. Second fixing portion 70b is located outside of first fixing portion 70a in the radial direction of fixing member 70. Second fixing portion 70b extends to the side opposite to the direction in which first fixing portion 70a extends. In other words, second fixing portion 70b extends from main body portion 70d toward exhaust terminal 40 shown in FIG. 1.

Second fixing portion 70b is connected to exhaust pipe 30. Specifically, a part of exhaust pipe 30 on the inside end portion 30b side is inserted into a cylindrical through hole of second fixing portion 70b, and the inner circumferential surface of second fixing portion 70b is in contact with the outer circumferential surface of exhaust pipe 30. In other words, second fixing portion 70b is fitted around exhaust pipe 30. Second fixing portion 70b is formed to have an inner diameter smaller than the outer diameter of exhaust pipe 30, thereby allowing exhaust pipe 30 to be fixed with the elastic force of second fixing portion 70b. In the present embodiment, a binding band 71 is tightened to squeeze the outer circumferential surface of second fixing portion 70b, so that the inner circumferential surface of second fixing portion 70b can be brought firmly into contact with the outer circumferential surface of exhaust pipe 30. Thereby, exhaust pipe 30 can be firmly fixed by second fixing portion 70b.

Third fixing portion 70c is formed in a tubular shape. Specifically, third fixing portion 70c has a cylindrical tubular shape. Third fixing portion 70c is located outside of first fixing portion 70a in the radial direction of fixing member 70. Furthermore, third fixing portion 70c is located outside of second fixing portion 70b in the radial direction of fixing member 70. Third fixing portion 70c extends to the side opposite to the direction in which second fixing portion 70b extends. In other words, third fixing portion 70c extends from main body portion 70d toward combustion apparatus 50 shown in FIG. 1.

Third fixing portion 70c is connected to protection tube 80. Specifically, a part of protection tube 80 on the tip end portion 80a side is inserted into a cylindrical through hole of third fixing portion 70c, and the inner circumferential surface of third fixing portion 70c is in contact with the outer circumferential surface of protection tube 80. In other words, third fixing portion 70c is fitted around protection tube 80. Third fixing portion 70c is formed to have an inner diameter smaller than the outer diameter of protection tube 80, thereby allowing protection tube 80 to be fixed with the elastic force of third fixing portion 70c. In the present embodiment, binding band 71 is tightened to squeeze the outer circumferential surface of third fixing portion 70c, so that the inner circumferential surface of third fixing portion 70c is brought firmly into contact with the outer circumferential surface of protection tube 80. Thereby, protection tube 80 can be firmly fixed by third fixing portion 70c.

Main body portion 70d connects first fixing portion 70a and second fixing portion 70b. Furthermore, main body portion 70d connects second fixing portion 70b and third fixing portion 70c. Main body portion 70d has an annular portion leading to first fixing portion 70a; and a plate-shaped portion leading to this annular portion and second fixing portion 70b. Furthermore, the plate-shaped portion also leads to third fixing portion 70c.

Main body portion 70d has a communication hole 70e. The number of communication holes 70e may be one, or may be two or more. In the present embodiment, a plurality of communication holes 70e are provided. Each communication hole 70e allows communication between a first region R1 and a second region R2 separated from first region R1 by main body portion 70d. First region R1 is located between the outer circumferential surface of exhaust tube 20 and the inner circumferential surface of exhaust pipe 30. In the present embodiment, communication hole 70e is provided in the plate-shaped portion and penetrates through main body portion 70d in the direction in which exhaust tube 20 extends (in the axial direction).

Protection tube 80 serves to cover exhaust tube 20 to protect this exhaust tube 20. Protection tube 80 is connected to fixing member 70 and combustion apparatus 50. Protection tube 80 is greater in outer diameter than exhaust tube 20. A part of exhaust tube 20 on the rear end portion 20b side is inserted into protection tube 80.

It is to be noted that protection tube 80 is implemented as a flexible pipe such as an accordion pipe, but may be a spiral pipe. Protection tube 80 has flexibility, thereby allowing this protection tube 80 to readily conform to the shape of exhaust tube 20. Furthermore, protection tube 80 and combustion apparatus 50 can readily be connected.

Furthermore, protection tube 80 may be a pipe made of aluminum, for example. In this case, since protection tube 80 can be reduced in weight, the load on fixing member 70 supporting protection tube 80 can be decreased. Also, since protection tube 80 has a certain degree of hardness, it becomes possible to suppress deformation of protection tube 80 caused by its self weight. Furthermore, since the pipe made of aluminum can be relatively readily processed, for example, cut and the like, it can readily be adapted to the length of exhaust tube 20, for example.

Combustion apparatus 50 used in the present embodiment may be a water heater of a latent heat recovery type, for example, adapted to an exhaust suction and combustion system, as described above. The configuration of the water heater of a latent heat recovery type adapted to the exhaust suction and combustion system will be described below.

Referring to FIGS. 6 and 7, combustion apparatus 50 mainly has a burner 51, a primary heat exchanger 52, a secondary heat exchanger 53, an exhaust box 54, a fan 55, an exhaust connection pipe 56, a drainage water tank 57, a housing 58, and pipes 61 to 66.

Burner 51 serves to produce combustion gas by burning fuel gas. A gas supply pipe 62 is connected to burner 51. This gas supply pipe 62 serves to supply fuel gas to burner 51. A gas valve (not shown) implemented, for example, by an electromagnetic valve is attached to this gas supply pipe 62.

A spark plug 51a is disposed above burner 51. This spark plug 51a serves to ignite an air fuel mixture injected from burner 51 to thereby produce a flame, by generating sparks between the plug and a target (not shown) provided in burner 51 by activating an ignition device (an igniter). Burner 51 generates a quantity of heat by burning fuel gas supplied from gas supply pipe 62 (which is called a combustion operation).

Primary heat exchanger 52 is a heat exchanger of a sensible heat recovery type. This primary heat exchanger 52 mainly has a plurality of plate-shaped fins 52b, a heat conduction pipe 52a penetrating the plurality of plate-shaped fins 52b, and a case 52c accommodating fins 52b and heat conduction pipe 52a. Primary heat exchanger 52 exchanges heat with the combustion gas generated by burner 51, and specifically, it serves to heat hot water and water which flows through heat conduction pipe 52a of primary heat exchanger 52 with the quantity of heat generated as a result of the combustion operation of burner 51.

Secondary heat exchanger 53 is a heat exchanger of a latent heat recovery type. This secondary heat exchanger 53 is located downstream of primary heat exchanger 52 in a flow of the combustion gas and connected in series with primary heat exchanger 52. Since combustion apparatus 50 according to the present embodiment thus has secondary heat exchanger 53 of a latent heat recovery type, it serves as a water heater of a latent heat recovery type.

Secondary heat exchanger 53 mainly has a drainage water discharge port 53a, a heat conduction pipe 53b, a sidewall 53c, a bottom wall 53d, and an upper wall 53g. Heat conduction pipe 53b is layered as it is spirally wound. Sidewall 53c, bottom wall 53d and upper wall 53g are arranged to surround heat conduction pipe 53b.

In secondary heat exchanger 53, hot water and water which flows through heat conduction pipe 53b is pre-heated (heated) through heat exchange with the combustion gas of which heat has been exchanged in primary heat exchanger 52. As a temperature of the combustion gas is lowered to approximately 60° C. through this process, moisture contained in the combustion gas is condensed so that latent heat can be obtained. In addition, latent heat is recovered in secondary heat exchanger 53 and moisture contained in the combustion gas is condensed, whereby drainage water is produced.

Bottom wall 53d serves as a partition between primary heat exchanger 52 and secondary heat exchanger 53, and it also serves as an upper wall of primary heat exchanger 52. This bottom wall 53d is provided with an opening portion 53e, and this opening portion 53e allows communication between a space where heat conduction pipe 52a of primary heat exchanger 52 is arranged and a space where heat conduction pipe 53b of secondary heat exchanger 53 is arranged. As shown by hollow arrows in FIG. 7, the combustion gas can flow from primary heat exchanger 52 to secondary heat exchanger 53 through opening portion 53e.

In this embodiment, for the sake of simplification, although one common component is employed for bottom wall 53d of secondary heat exchanger 53 and the upper wall of primary heat exchanger 52, an exhaust collection and guide member may be connected between primary heat exchanger 52 and secondary heat exchanger 53.

Upper wall 53g is provided with an opening portion 53h, and this opening portion 53h allows communication between the space where heat conduction pipe 53b of secondary heat exchanger 53 is arranged and an internal space in exhaust box 54. As shown by hollow arrows in FIG. 7, the combustion gas can flow from secondary heat exchanger 53 into the internal space in exhaust box 54 through opening portion 53h.

Drainage water discharge port 53a is provided in sidewall 53c or bottom wall 53d. This drainage water discharge port 53a opens at a lowest position in the space surrounded by side wall 53c, bottom wall 53d and upper wall 53g (the lowermost position in the vertical direction in the state where the water heater is placed), which is lower than the lowermost portion of heat conduction pipe 53b. Thus, drainage water produced in secondary heat exchanger 53 can be guided to drainage water discharge port 53a along bottom wall 53d and sidewall 53c as shown by a black arrow in FIG. 7.

Exhaust box 54 forms a path for a flow of the combustion gas between secondary heat exchanger 53 and fan 55. This exhaust box 54 can guide, to fan 55, the combustion gas of which heat has been exchanged in secondary heat exchanger 53. Exhaust box 54 is attached to secondary heat exchanger 53 and located downstream of secondary heat exchanger 53 in the flow of the combustion gas.

Exhaust box 54 mainly has a box main body 54a and a fan connection portion 54b. An internal space in box main body 54a communicates through opening portion 53h in secondary heat exchanger 53 with the internal space where heat conduction pipe 53b of secondary heat exchanger 53 is arranged. Fan connection portion 54b is provided so as to protrude from an upper portion of box main body 54a. This fan connection portion 54b has, for example, a cylindrical shape, and an internal space 54ba thereof communicates with the internal space in box main body 54a.

Fan 55 serves to emit the combustion gas (of which heat has been exchanged in secondary heat exchanger 53), which has passed through secondary heat exchanger 53, to the outside of combustion apparatus 50 by suctioning the combustion gas. This fan 55 is located downstream of exhaust box 54 and secondary heat exchanger 53 in the flow of the combustion gas. Namely, in combustion apparatus 50, burner 51, primary heat exchanger 52, secondary heat exchanger 53, exhaust box 54, and fan 55 are arranged in this order from upstream to downstream in the flow of the combustion gas produced in burner 51. Since the combustion gas is suctioned and exhausted by means of fan 55 as above in this arrangement, combustion apparatus 50 in the present embodiment is a water heater adapted to the exhaust suction and combustion system.

Fan 55 mainly has a rotor 55a, a fan case 55b, a drive source 55c, and a rotation shaft 55d. Fan case 55b is attached to fan connection portion 54b of exhaust box 54 such that the internal space in fan case 55b and the internal space in fan connection portion 54b communicate with each other. Thus, as shown by the hollow arrows in FIG. 7, the combustion gas can be suctioned from box main body 54a of exhaust box 54 through fan connection portion 54b into fan case 55b.

Rotor 55a is arranged in fan case 55b. This rotor 55a is connected to drive source 55c with rotation shaft 55d interposed therebetween. Thus, rotor 55a is provided with drive force from drive source 55c and can rotate around rotation shaft 55d. By rotation of rotor 55a, the combustion gas in exhaust box 54 can be suctioned from the inner circumferential side of rotor 55a and can be emitted to the outer circumferential side of rotor 55a.

Exhaust connection pipe 56 is connected to a region within fan case 55b, on the outer circumferential side of a region where rotor 55a is arranged. Therefore, the combustion gas emitted to the outer circumferential side of rotor 55a by rotor 55a of fan 55 can be emitted into exhaust tube 20 through exhaust connection pipe 56.

The combustion gas produced by burner 51 as above is suctioned by fan 55 by rotation of rotor 55a above, so that the combustion gas can reach fan 55 after passage through primary heat exchanger 52, secondary heat exchanger 53 and exhaust box 54 in this order as shown by the hollow arrows in FIG. 7 and can be emitted to the outside of combustion apparatus 50.

Drainage water tank 57 serves to store drainage water produced in secondary heat exchanger 53. This drainage water tank 57 is connected to secondary heat exchanger 53 through pipe 61. Pipe 61 is connected to drainage water discharge port 53a of secondary heat exchanger 53. Thus, the drainage water produced in secondary heat exchanger 53 can be discharged to drainage water tank 57. A pipe 66 extending to the outside of combustion apparatus 50 is connected to drainage water tank 57. The drainage water stored in drainage water tank 57 can be discharged to the outside of combustion apparatus 50 through this pipe 66.

This drainage water tank 57 has a water seal structure. Namely, drainage water tank 57 has such a structure that, when a prescribed amount of drainage water is stored in drainage water tank 57, the stored drainage water cannot allow air to pass through drainage water tank 57. By such a water seal structure of drainage water tank 57, entry of air outside combustion apparatus 50 (outside air) into combustion apparatus 50 (secondary heat exchanger 53) through drainage water tank 57 via pipe 66 can be prevented.

A water supply pipe 63 is connected to one end of heat conduction pipe 53b of secondary heat exchanger 53 and a hot water delivery pipe 64 is connected to one end of heat conduction pipe 52a of primary heat exchanger 52. The other end of heat conduction pipe 52a of primary heat exchanger 52 and the other end of heat conduction pipe 53b of secondary heat exchanger 53 are connected to each other through a connection pipe 65. Each of gas supply pipe 62, water supply pipe 63 and hot water delivery pipe 64 described above leads to the outside, for example, in a top portion of combustion apparatus 50. Burner 51, primary heat exchanger 52, secondary heat exchanger 53, exhaust box 54, fan 55, drainage water tank 57, and the like are arranged in housing 58.

<Method of Installing Exhaust Tube, and the Like>

Referring to FIGS. 8 to 33, a method of installing exhaust tube 20, a method of placing combustion apparatus 50, a method of replacing a water heater, and an installation member set according to the present embodiment will be hereinafter described. The method of installing exhaust tube 20 according to the present embodiment is implemented by inserting exhaust tube 20 into exhaust pipe 30 that leads from the inside of building 200 to the outside thereof. Furthermore, the method of placing a combustion apparatus according to the present embodiment includes the steps of: installing exhaust tube 20; and placing the combustion apparatus (water heater) 50 on the inside of the building. Furthermore, the method of replacing combustion apparatus 50 according to the present embodiment includes the steps of: removing hot water storage-type water heater 90 placed on the inside of the building; installing exhaust tube 20; placing an instantaneous water heater (combustion apparatus 50) on the inside of the building.

In the method of installing an exhaust tube according to the present embodiment, an installation member set including a plurality of installation members to be used is employed. Referring to FIG. 32, the installation member set includes a first member set 301, a second member set 302, and a third member set 303.

First member set 301 has a first package 301a and installation members (mainly including exhaust tube 20, fixing member 70, binding band 71, and insertion jig 21) housed in first package 301a and used in the first inside step. Second member set 302 has a second package 302a and installation members (mainly including exhaust straightening member 41, connection member 42, exhaust adapter 43, and cutting guide 44) housed in second package 302a and used in the outside step. Third member set 303 has a third package 303a and installation members (mainly including an elbow tube 81, an exhaust tube adapter 82, a connection member for exhaust tube adapter 20c, a gasket 20d, a retaining ring 83, a protection tube 80, and a binding band 71) housed in third package 303a and used in the second inside step. First package 301a, second package 302a and third package 303a each may be a bag-shaped housing such as a bag made of resin, or a housing such as a carton box, for example.

Second package 302a may have a holding member for allowing second member set 302 to be held in the state where both hands of the operator can be used in the outside step. Referring to FIG. 33, examples of the holding member may be a string 302b (FIG. 33 (a)) that is placed on the operators shoulder or waist, and a strap 302c (FIG. 33 (b)) to be attached to the operator's belt or the like.

Figure 8:
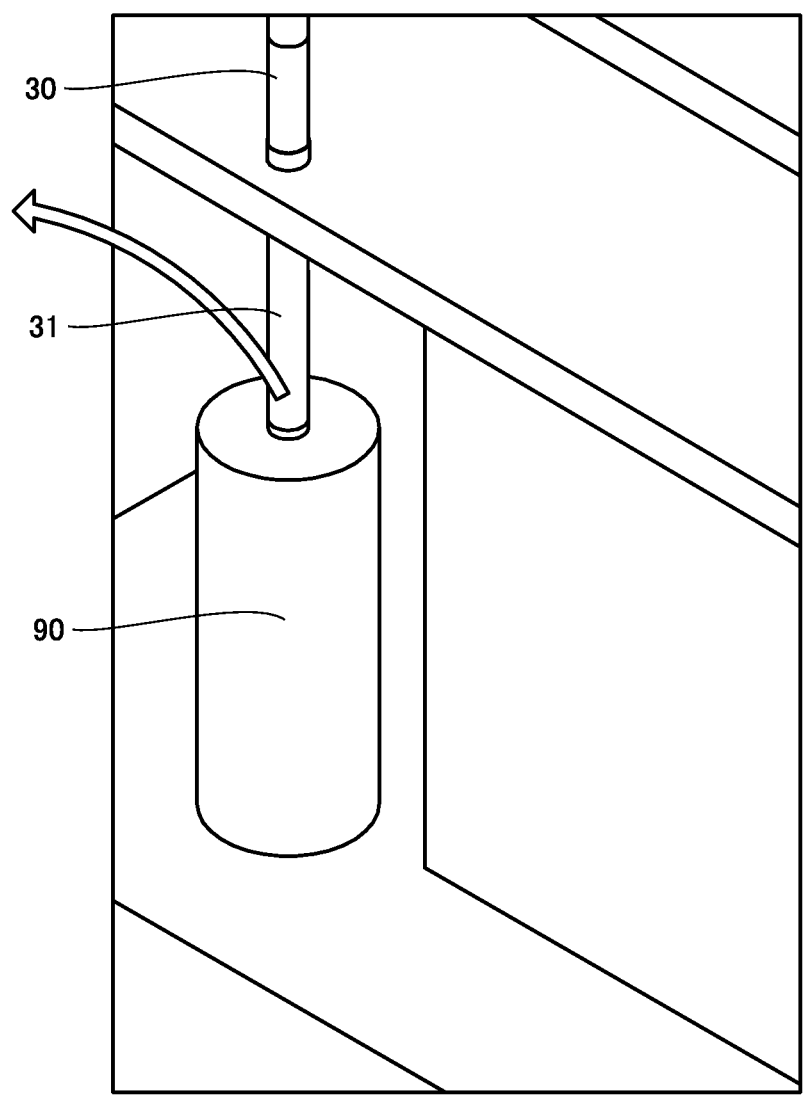
FIG. 8 is a schematic diagram for illustrating an operation step in a method of installing an exhaust tube, and the like, in one embodiment of the present invention.
Figure 14:
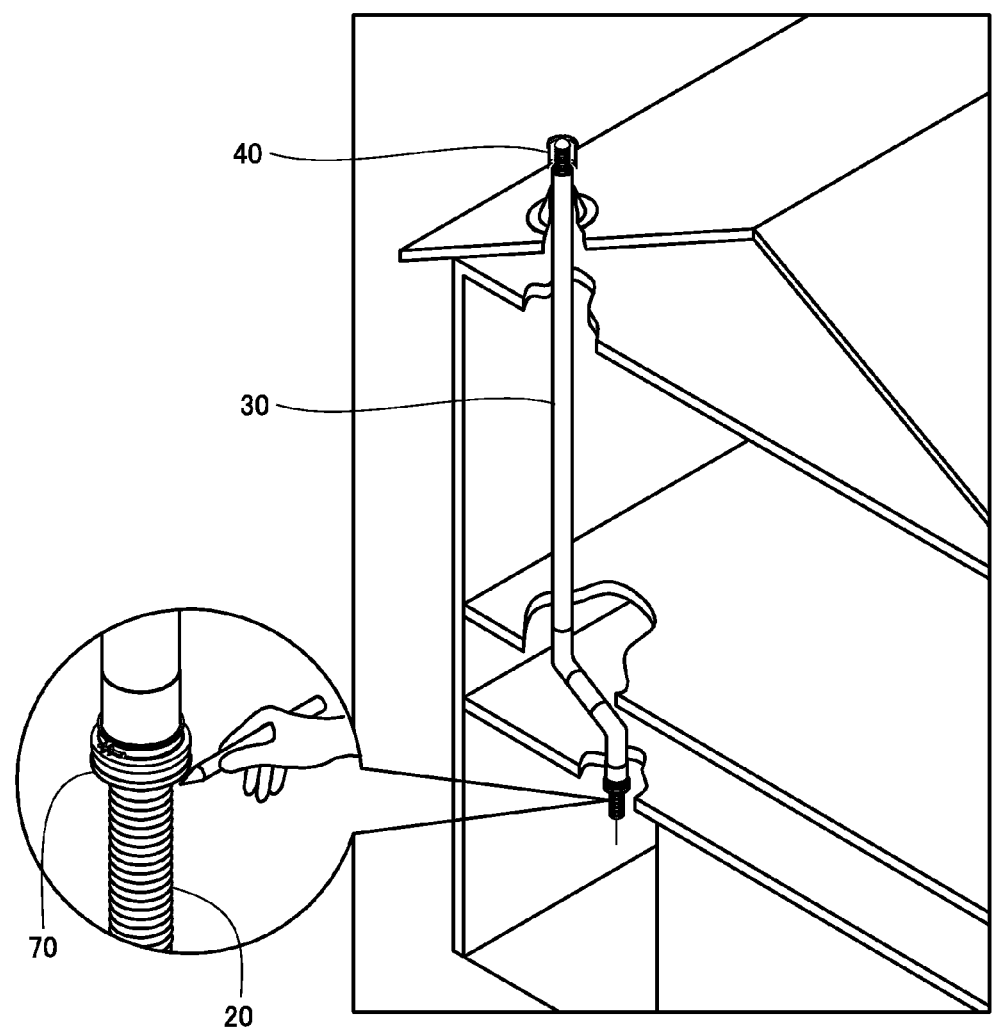
FIG. 14 is another schematic diagram for illustrating the operation step in the method of installing an exhaust tube, and the like, in one embodiment of the present invention.
Figure 15:
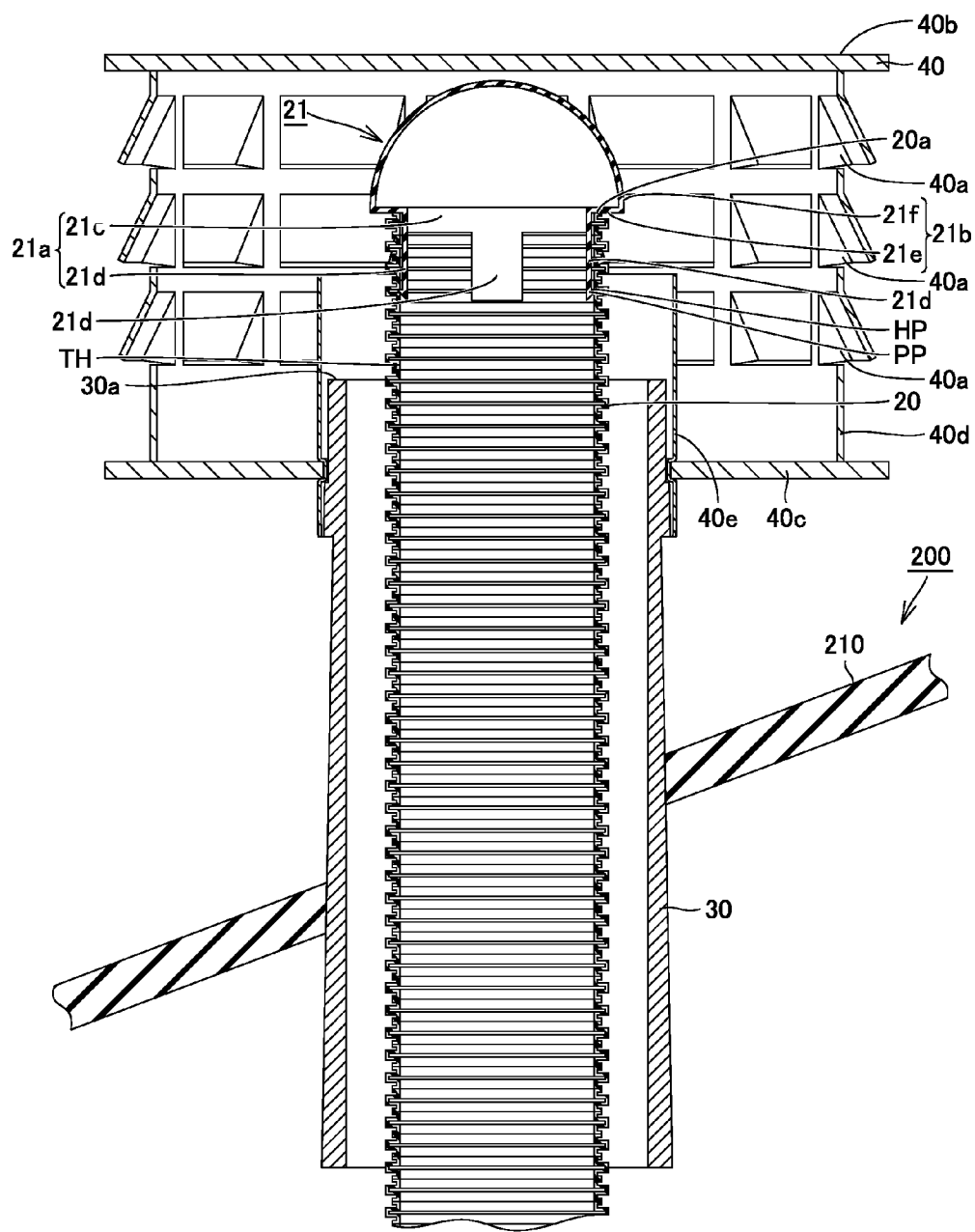
FIG. 15 is a cross-sectional view schematically showing the state where the exhaust tube having the insertion jig attached to the tip end portion is inserted into an exhaust pipe and temporarily fixed thereto, in the method of installing an exhaust tube in one embodiment of the present invention.
Figure 17:
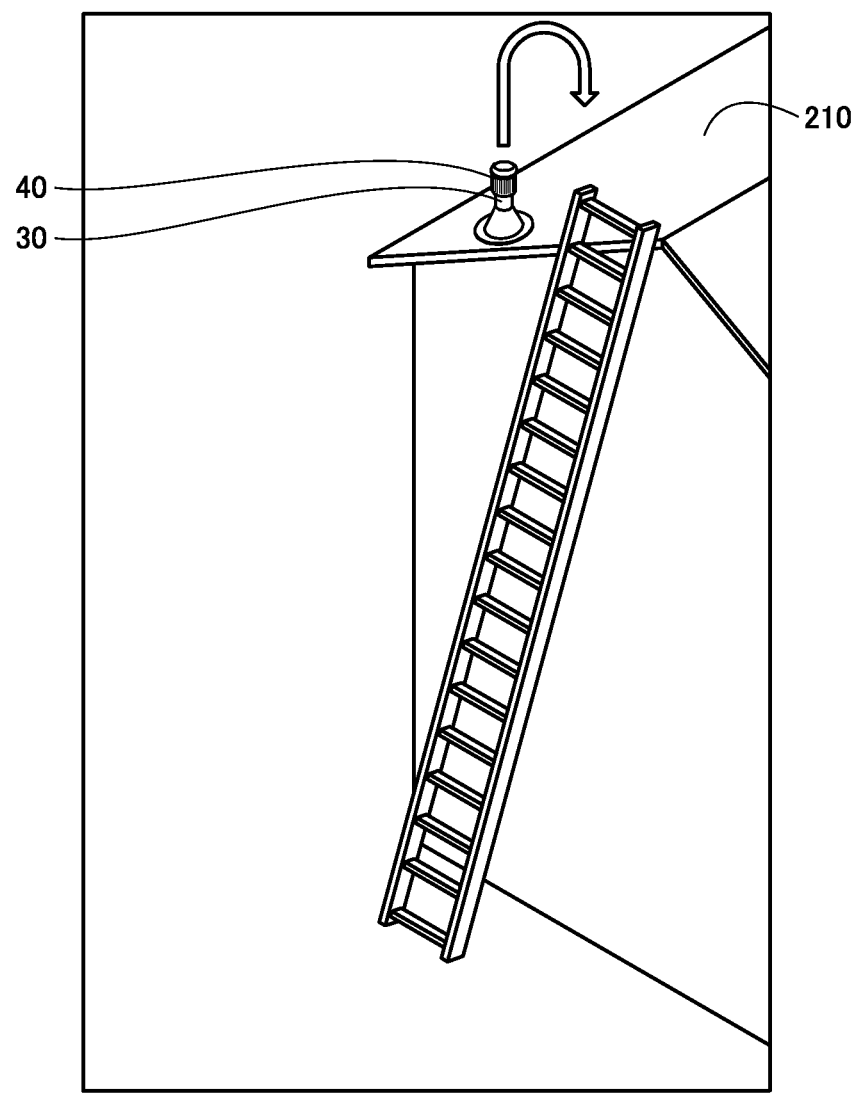
FIG. 17 is another schematic diagram for illustrating the operation step in the method of installing an exhaust tube, and the like, in one embodiment of the present invention.

Referring to FIG. 8, before installation, hot water storage-type water heater 90 is placed inside building 200, and the exhaust vent of hot water storage-type water heater 90 is connected to exhaust pipe 30 through connection pipe 31. Referring to FIGS. 14, 15 and 17, exhaust pipe 30 is placed in roof 210 of building 200 so as to extend from the inside of building 200 to the outside thereof. Exhaust terminal 40 is attached to the upper end (outside end portion 30a) of exhaust pipe 30.

Prescribed installation conditions are checked before installation. For example, it is checked that the already-placed exhaust pipe 30 does not have a branch. This is because exhaust pipe 30 having a branch makes it difficult to apply the installation method of the present embodiment. For example, it is also checked that the temperature inside the building in which hot water storage-type water heater 90 is placed is higher than 45 degrees Fahrenheit. This is because, if new exhaust tube 20 is made of resin, exhaust tube 20 hardens and loses its flexibility at a temperature equal to or lower than 45 degrees Fahrenheit, so that it becomes difficult to insert this exhaust tube 20 into exhaust pipe 30 having a bend.

Figure 9:
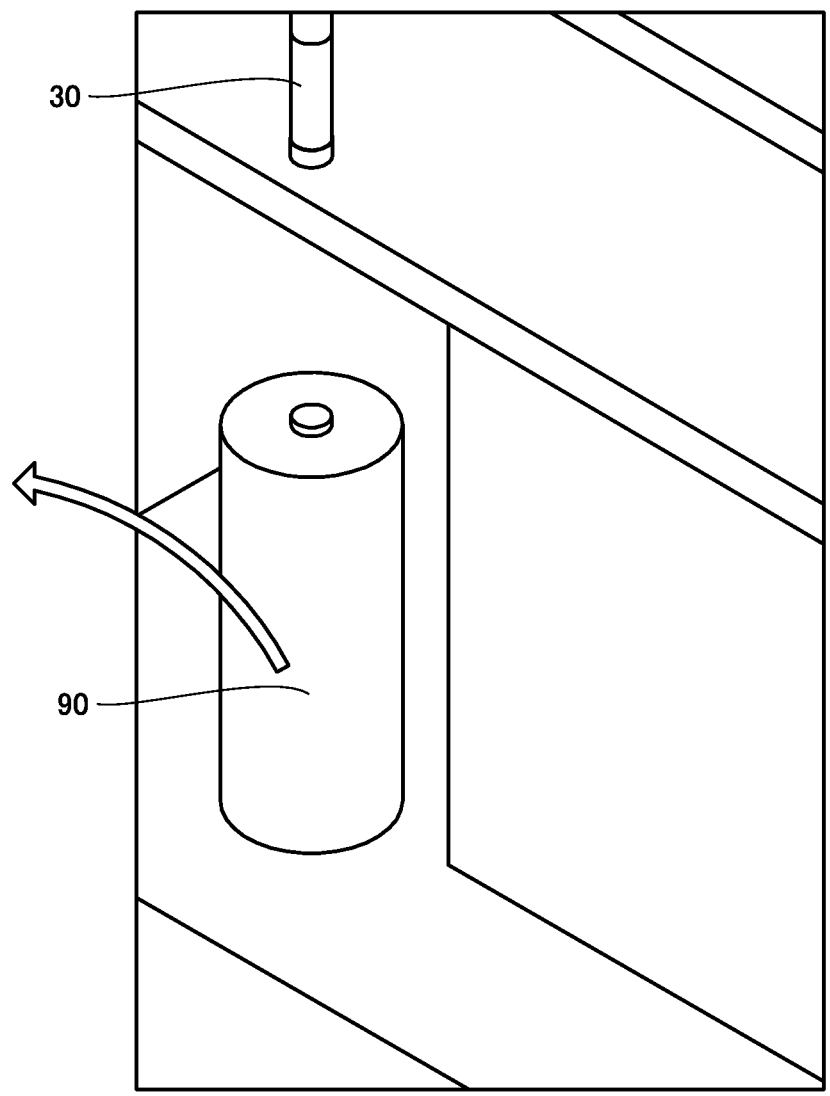
FIG. 9 is another schematic diagram for illustrating the operation step in the method of installing an exhaust tube, and the like, in one embodiment of the present invention.

Then, referring to FIGS. 8 and 9, connection pipe 31 connecting exhaust pipe 30 and hot water storage-type water heater 90 is removed (FIG. 8), and then, hot water storage-type water heater 90 is removed (FIG. 9).

Then, first package 301a of first member set 301 is unpacked, and the installation members used in the first inside step are prepared.

Figure 10:
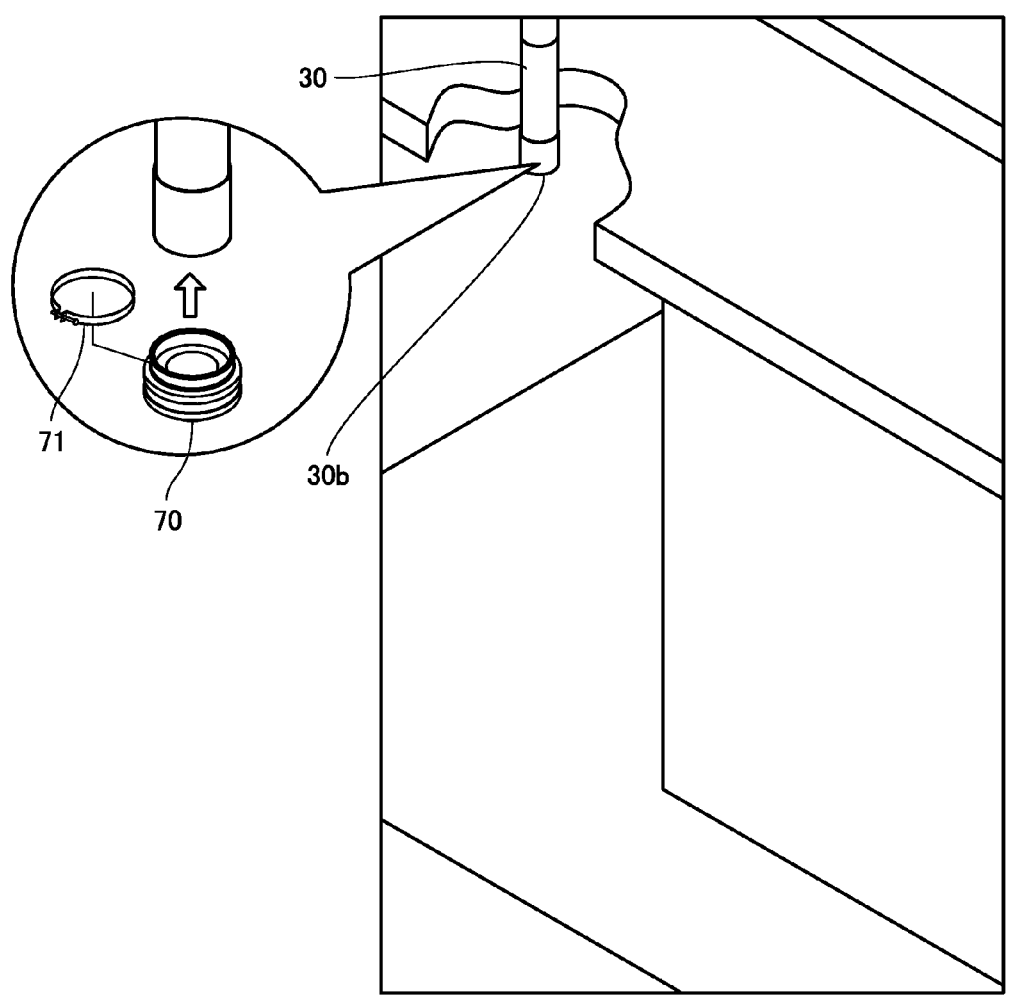
FIG. 10 is another schematic diagram for illustrating the operation step in the method of installing an exhaust tube, and the like, in one embodiment of the present invention.

Then, referring to FIG. 10, fixing member 70 is attached to inside end portion 30b of exhaust pipe 30. Specifically, referring to FIGS. 4 and 5, when binding band 71 is tightened to squeeze the outer circumferential surface of second fixing portion 70b in the state where second fixing portion 70b is fitted around exhaust pipe 30 as described above, second fixing portion 70b is firmly fixed to exhaust pipe 30.

Figure 11:
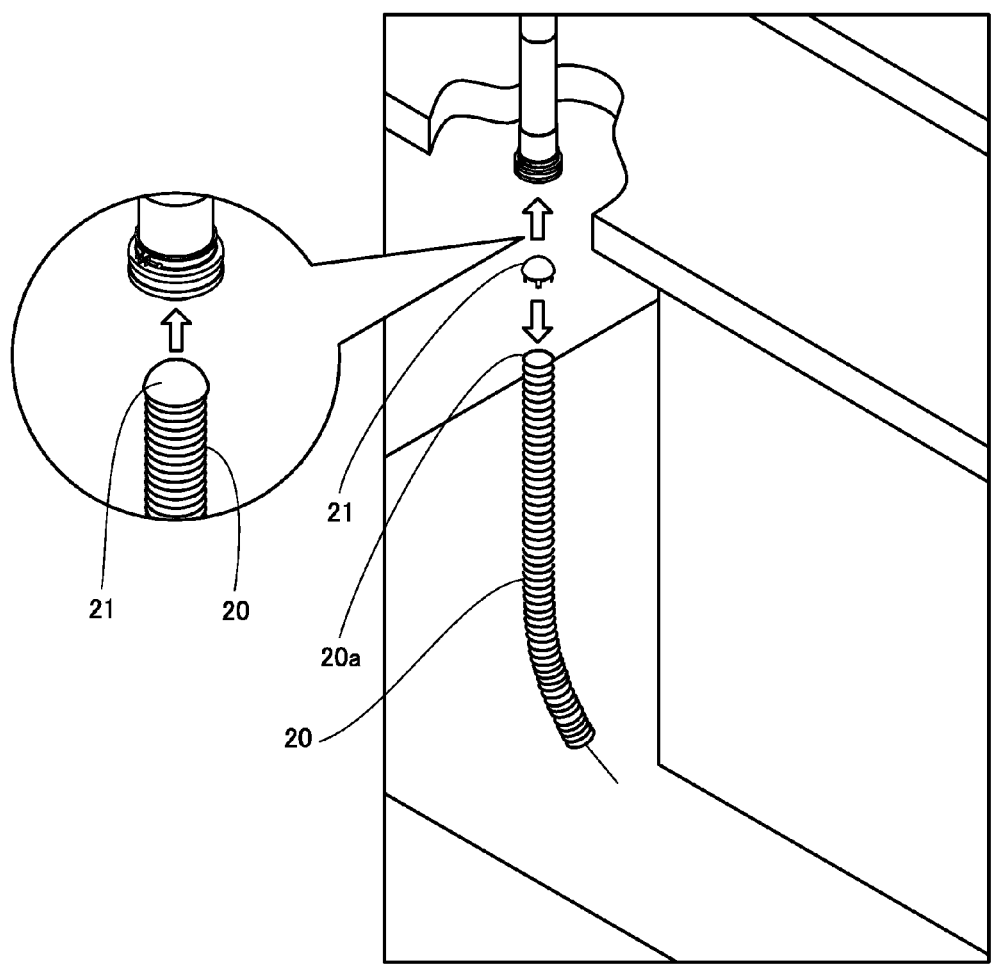
FIG. 11 is another schematic diagram for illustrating the operation step in the method of installing an exhaust tube, and the like, in one embodiment of the present invention.

Then, referring to FIG. 11, a preparation for inserting exhaust tube 20 into exhaust pipe 30 is made. Namely, insertion jig 21 is attached to tip end portion 20a of exhaust tube 20. Specifically, referring to FIGS. 12 and 13, support portion 21a of insertion jig 21 is inserted into a through hole TH from the tip end portion 20a side of exhaust tube 20. Furthermore, a projection PP of a tongue portion 21d in support portion 21a is engaged with a recess HP of exhaust tube 20. Consequently, insertion jig 21 is fixed to exhaust tube 20.

Then, an end of exhaust tube 20 on the side of tip end portion 20a having insertion jig 1 fixed thereto is inserted into exhaust pipe 30. In other words, exhaust tube 20 is pushed into exhaust pipe 30 from the inside of the building to the outside thereof under the guidance of a curved portion 21f of protruding portion 21b in insertion jig 21.

Figure 12:
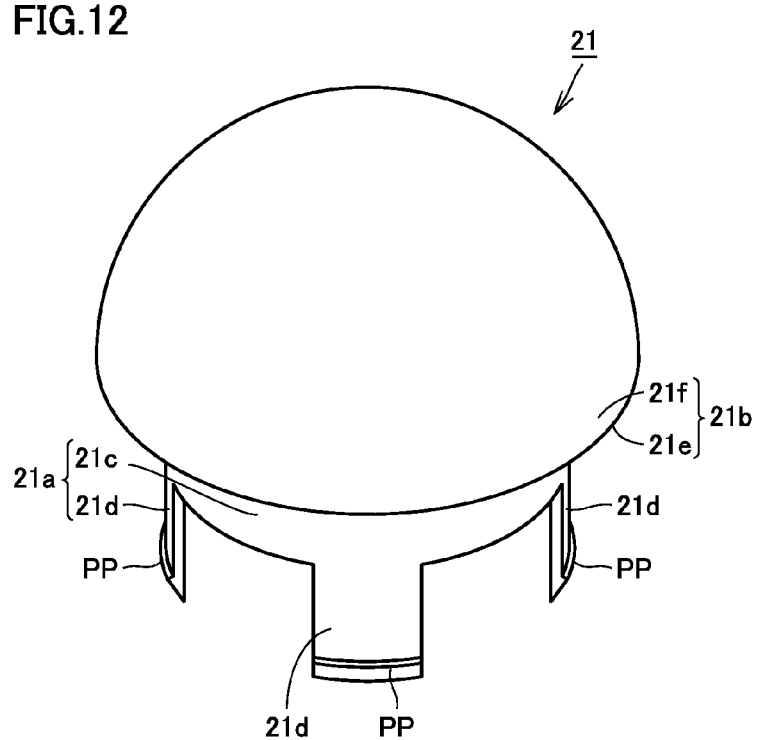
FIG. 12 is a perspective view schematically showing the configuration of an insertion jig used in the method of installing an exhaust tube in one embodiment of the present invention.
Figure 13:
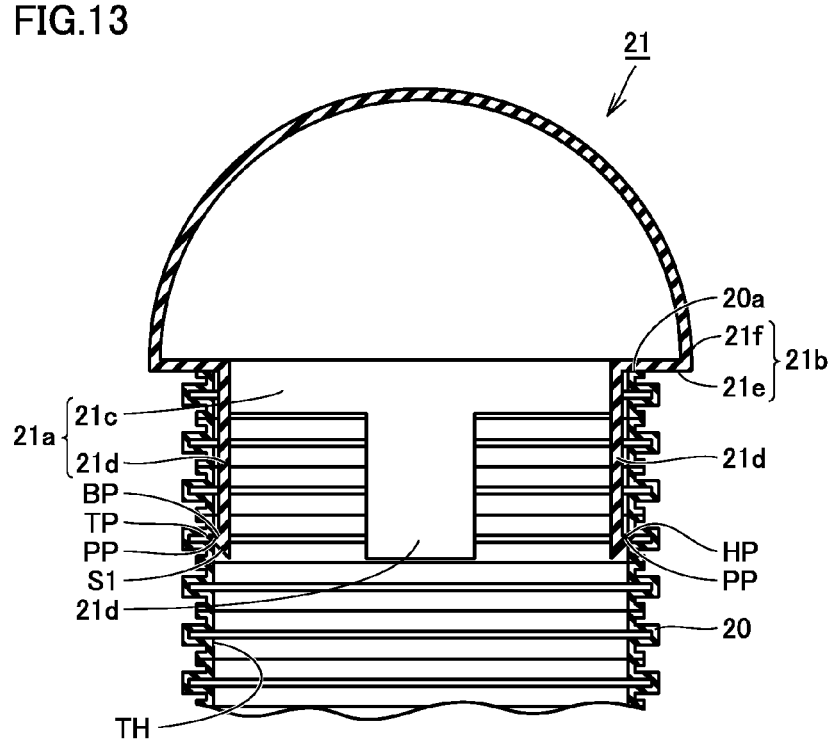
FIG. 13 is a cross-sectional view schematically showing the state where the insertion jig is attached to a tip end portion of the exhaust tube in the method of installing an exhaust tube in one embodiment of the present invention.

Then, referring to FIGS. 12 and 13, the configuration of insertion jig 21 used for inserting exhaust tube 20 into exhaust pipe 30 in the present embodiment will be described in detail.

Insertion jig 21 has a support portion 21a and a protruding portion 21b. Support portion 21a and protruding portion 21b are integrally formed. Insertion jig 21 is formed of resin. This resin may be polypropylene (PP), acrylonitrile-butadiene-styrene copolymerization synthetic resin (ABS), and polyvinyl chloride (PVC), for example. Support portion 21a is used for attaching insertion jig 21 to exhaust tube 20. Support portion 21a is configured such that it can be inserted into through hole TH of exhaust tube 20. Support portion 21a has a cylindrical portion 21c and a tongue portion 21d. Cylindrical portion 21c is connected to protruding portion 21b. Support portion 21a has an outer circumferential surface. The outer circumferential surface of cylindrical portion 21c is formed so as to extend along the entire circumference of the inner circumferential surface of exhaust tube 20 in the circumferential direction. Tongue portion 21d protrudes from cylindrical portion 21c to a side opposite to protruding portion 21b. Tongue portion 21d has an outer circumferential surface that is formed so as to extend along a part of the inner circumferential surface of exhaust tube 20 in the circumferential direction. Accordingly, tongue portion 21d is readily elastically deformed while facing the inner circumferential surface of exhaust tube 20.

According to the present embodiment, four tongue portions 21d are provided. These four tongue portions 21d are arranged in cylindrical portion 21c uniformly in the circumferential direction. It is to be noted that the number of tongue portions 21d is not limited to four, but may be two or more, or may be one.

Support portion 21a has a projection PP that projects from the outer circumferential surface to the outside. Specifically, projection PP is provided at the tip end of tongue portion 21d. Projection PP is hooked in recess HP provided in the inner circumferential surface of exhaust tube 20, so that support portion 21a is supported by exhaust tube 20.

Projection PP has a tip end portion TP and a root portion BP. Tip end portion TP protrudes from the outer circumferential surface of tongue portion 21d to the outside. Tip end portion TP is located in the outermost circumference of projection PP. Root portion BP is located on the outer circumferential surface of tongue portion 21d. Projection PP has a first inclined surface 51 that inclines from tip end portion TP toward root portion BP on the side of rear end portion 20b of exhaust tube 20. Namely, projection PP has a tapered shape such that its cross-sectional area is decreased toward rear end portion 20b of exhaust tube 20. First inclined surface 51 is provided at the tip end of tongue portion 21d.

Protruding portion 21b protrudes from support portion 21a to a side opposite to exhaust tube 20 in the state where support portion 21a is inserted into through hole TH from the tip end portion 20a side of exhaust tube 20. Protruding portion 21b covers through hole TH on the tip end portion 20a side of exhaust tube 20. Protruding portion 21b is curved convexly toward a side opposite to support portion 21a. Specifically, protruding portion 21b has a flange portion 21e and a curved portion 21f. Flange portion 21e is connected to support portion 21a and extends outward in the radial direction. Curved portion 21f is connected to the outer circumferential edge of flange portion 21e, and formed to be curved convexly relative to flange portion 21e, toward a side opposite to support portion 21a. Furthermore, flange portion 21e protrudes outward beyond the outer diameter of exhaust tube 20. Accordingly, when curved portion 21f is viewed from the curved portion 21f side in the direction toward support portion 21a, through hole TH (an opening of tip end portion 20a) of exhaust tube 20 cannot be seen.

Then, referring to FIGS. 14 and 15, exhaust tube 20 is pushed into exhaust pipe 30 until tip end portion 20a of exhaust tube 20 (insertion jig 21) comes into contact with ceiling wall 40b of exhaust terminal 40. Accordingly, exhaust tube 20 can be inserted into exhaust pipe 30 until tip end portion 20a of exhaust tube 20 protrudes from outside end portion 30a of exhaust pipe 30. However, tip end portion 20a of exhaust tube 20 does not necessarily have to protrude from outside end portion 30a of exhaust pipe 30 at this point of time, but tip end portion 20a of exhaust tube 20 only has to reach the position at which exhaust tube 20 can be pulled out from outside end portion 30a of exhaust pipe 30 in the outside step described later. If tip end portion 20a of exhaust tube 20 reaches at least the outside of building 200, exhaust tube 20 can often be pulled out from outside end portion 30a of exhaust pipe 30. It is to be noted that the outside of the building used herein is a position on the outside of the plane formed by a roof, an outer wall and the like of a building, and, in the present embodiment, means a position on the outer side (upper side) than the plane including the outer surface of roof 210 (see FIG. 15).

Referring to FIG. 14, positioning marking is carried out using a marking pen in the state where exhaust tube 20 is inserted into exhaust pipe 30. By this positioning marking, it can be checked in the second inside step after the outside step whether slipping down or the like of exhaust tube 20 due to release of fixation by exhaust adapter 43 occurs or not after the inside step described later.

Figure 16:
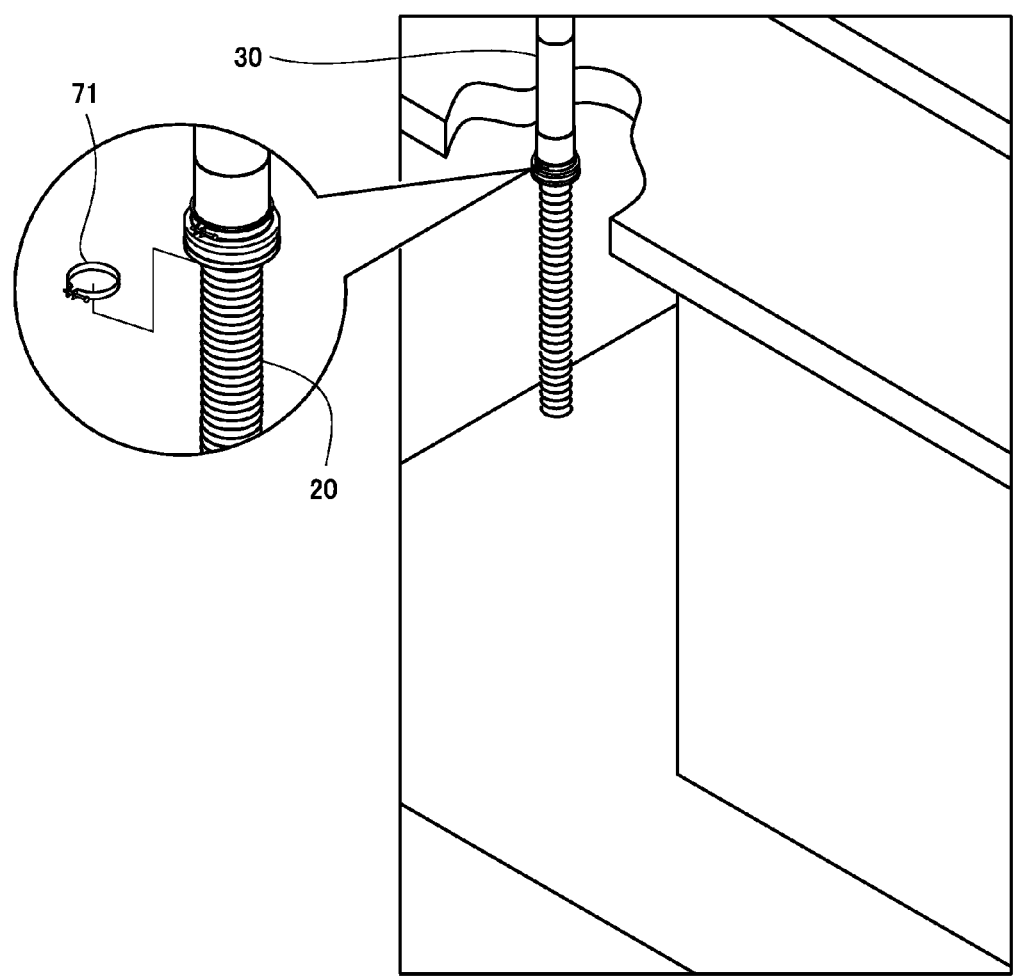
FIG. 16 is another schematic diagram for illustrating the operation step in the method of installing an exhaust tube, and the like, in one embodiment of the present invention.

Then, referring to FIG. 16, exhaust tube 20 is temporarily fixed to inside end portion 30b of exhaust pipe 30 by fixing member 70. Specifically, referring to FIGS. 4 and 5, binding band 71 is tightened to squeeze the outer circumferential surface of first fixing portion 70a with the force weaker than that applied in the case of full-scale fixation described above with reference to FIG. 4. Thereby, exhaust tube 20 can be temporarily fixed to inside end portion 30b of exhaust pipe 30 such that exhaust tube 20 does not fall by its self weight but can be moved relative to exhaust pipe 30 at the time when a prescribed amount or more of external force is applied. In addition, the step of temporarily fixing exhaust tube 20 can also be omitted in the state where the inner circumferential surface of first fixing portion 70a is in contact with the outer circumferential surface of exhaust tube 20 with relatively weak force, and thus, exhaust tube 20 does not fall by its self weight.

The above-described steps constitute the first inside step in which the operation is first performed on the inside of the building. After this first inside step, the operator moves to the outside of the building, and performs the outside step in which the operation is performed on the outside of the building.

Then, referring to FIG. 17, the operator climbs up on top of roof 210 of building 200. At this time, the operator carries second member set 302 described above. It is preferable that second member set 302 is attached to the operator by a holding member (string 302b, strap 302c or the like) so as not to disturb the operation.

Then, exhaust terminal 40 is removed from exhaust pipe 30. The figure shows that the removed exhaust terminal 40 is placed on roof 210. It is to be noted that it is desirable that removed exhaust terminal 40 is placed in a position that is horizontal as much as possible, or housed within second package 302a of second member set 302 attached to the operator, or the like for preventing falling of exhaust terminal 40 in the outside step.

Figure 18:
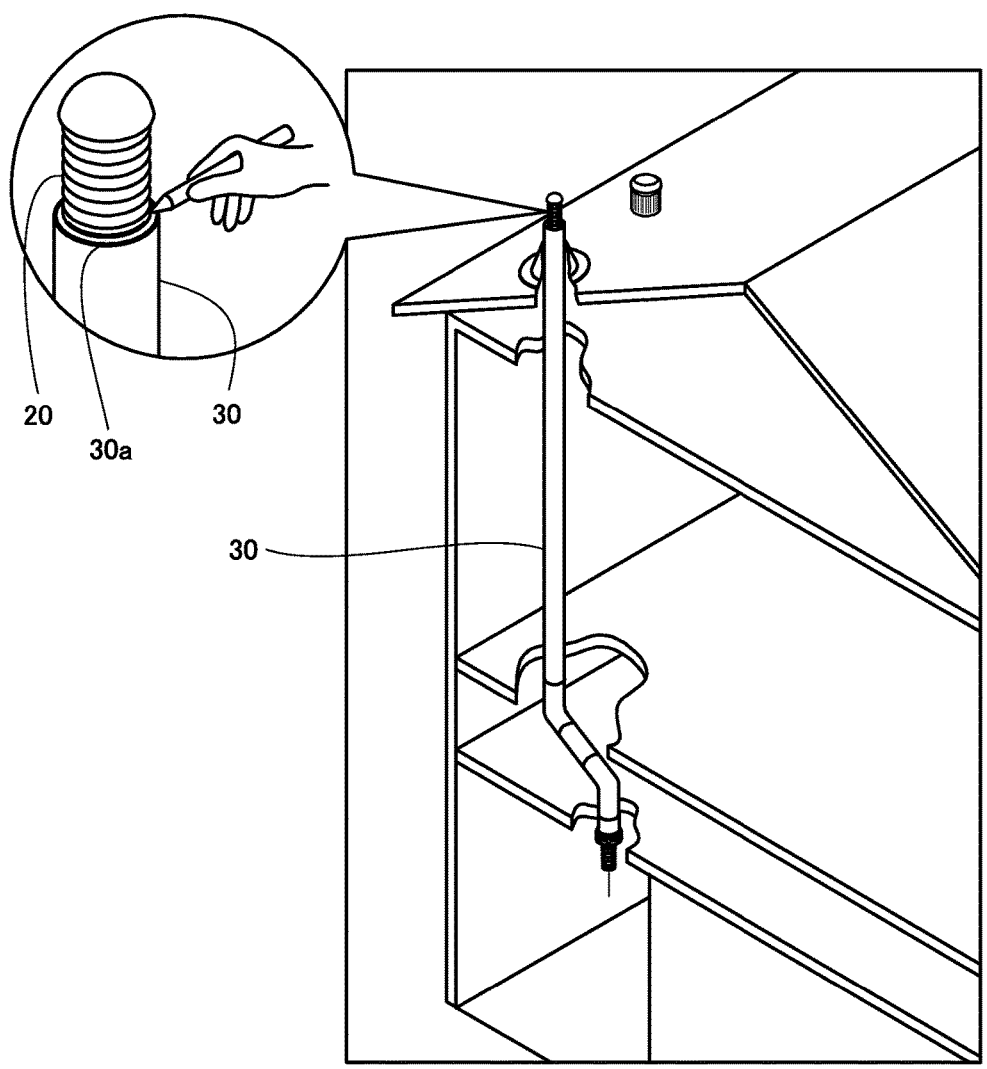
FIG. 18 is another schematic diagram for illustrating the operation step in the method of installing an exhaust tube, and the like, in one embodiment of the present invention.
Figure 19:
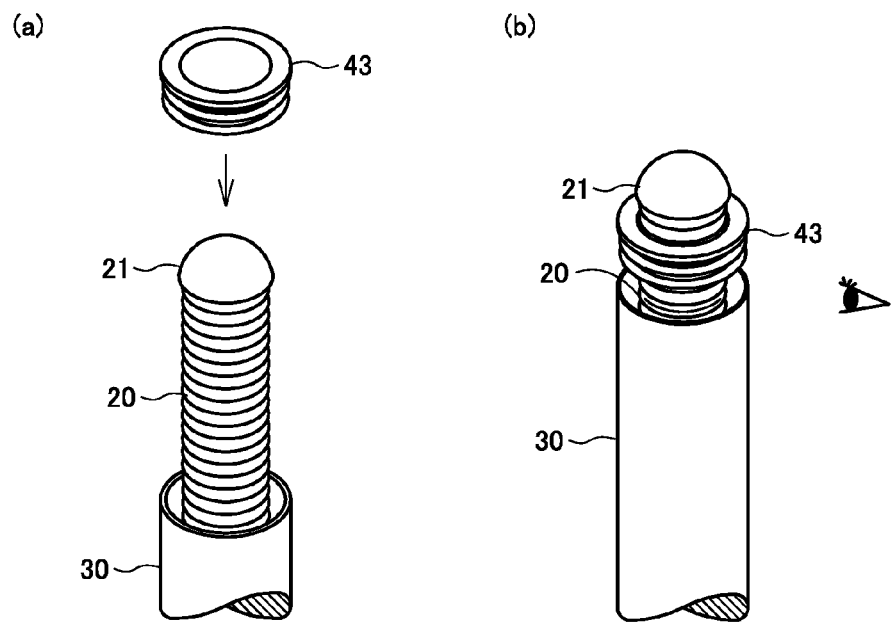
FIG. 19 is another schematic diagram for illustrating the operation step in the method of installing an exhaust tube, and the like, in one embodiment of the present invention.

Then, referring to FIG. 18, a position of exhaust tube 20 corresponding to outside end portion 30a of exhaust pipe 30 is marked for positioning by using a marking pen.

Then, referring to FIG. 19(a), exhaust tube 20 is inserted through the through hole of exhaust adapter 43, and exhaust adapter 43 is fitted into the gap between the outer circumferential surface of exhaust tube 20 and the inner circumferential surface of exhaust pipe 30. Referring to FIG. 19(b), in this case, the operation of fitting exhaust adapter 43 is performed while the operator is checking by means of positioning marking described with reference to FIG. 18 that exhaust tube 20 does not slip down relative to exhaust pipe 30.

Exhaust adapter 43 is fitted on the outer circumferential surface of exhaust tube 20. Exhaust adapter 43 is fitted on the outer circumferential surface of exhaust tube 20 such that the inner circumferential surface of exhaust adapter 43 presses the outer circumferential surface of exhaust tube 20. Then, exhaust adapter 43 is inserted into exhaust pipe 30 from outside end portion 30a of exhaust pipe 30. In this case, exhaust adapter 43 is inserted into exhaust pipe 30 such that the outer circumferential surface of exhaust adapter 43 presses the inner circumferential surface of exhaust pipe 30.

Figure 20:
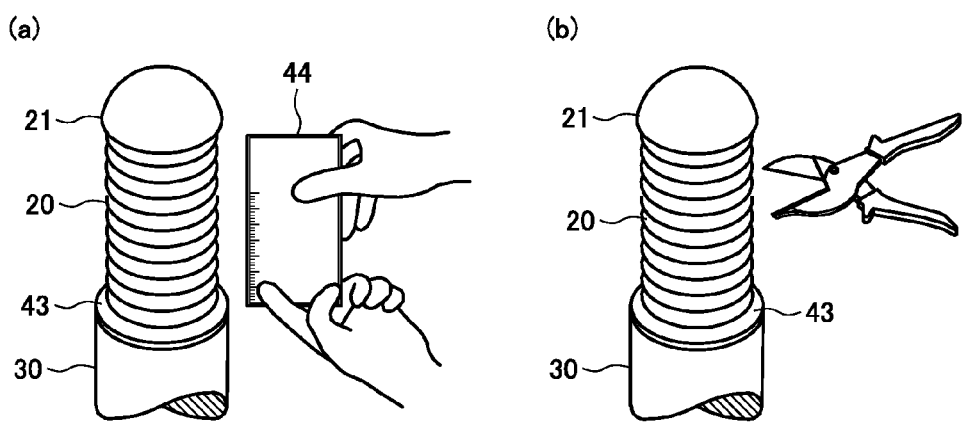
FIG. 20 is another schematic diagram for illustrating the operation step in the method of installing an exhaust tube, and the like, in one embodiment of the present invention.
Figure 21:
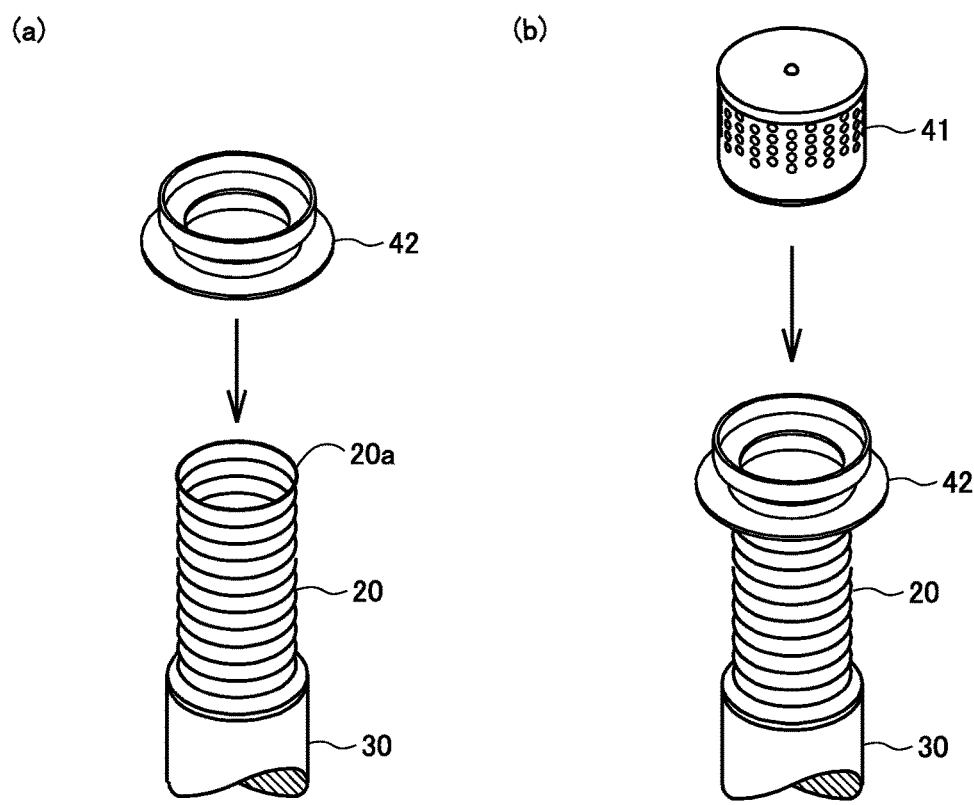
FIG. 21 is another schematic diagram for illustrating the operation step in the method of installing an exhaust tube, and the like, in one embodiment of the present invention.

Then, referring to FIG. 20(a), a cutting guide 44 is brought into contact with the upper end of exhaust adapter 43 to check the length suitable to the type of exhaust terminal 40 placed in the installation site. Then, referring to FIG. 20(b), exhaust tube 20 is cut to a length that is suitable to the type of exhaust terminal 40. Cutting guide 44 has an indicator showing the cut position of exhaust tube 20 for adjusting the length of this exhaust tube 20 to a length that is suitable to the type of exhaust terminal 40. This indicator is used to facilitate adjustment of the length of the exhaust tube in accordance with the type of the exhaust terminal, so that the operation time can be further shortened. Although FIG. 20 shows that exhaust tube 20 is cut while insertion jig 21 remains attached thereto, insertion jig 21 may be removed from exhaust tube 20 before cutting.

Then, referring to FIG. 21(a), connection member 42 is fitted on the outer circumferential surface of tip end portion 20a of exhaust tube 20 as described above (see FIG. 3). Then, referring to FIG. 21(b), exhaust straightening member 41 is fitted on the outer circumferential surface of connection member 42 as described above (see FIG. 3).

Figure 3:
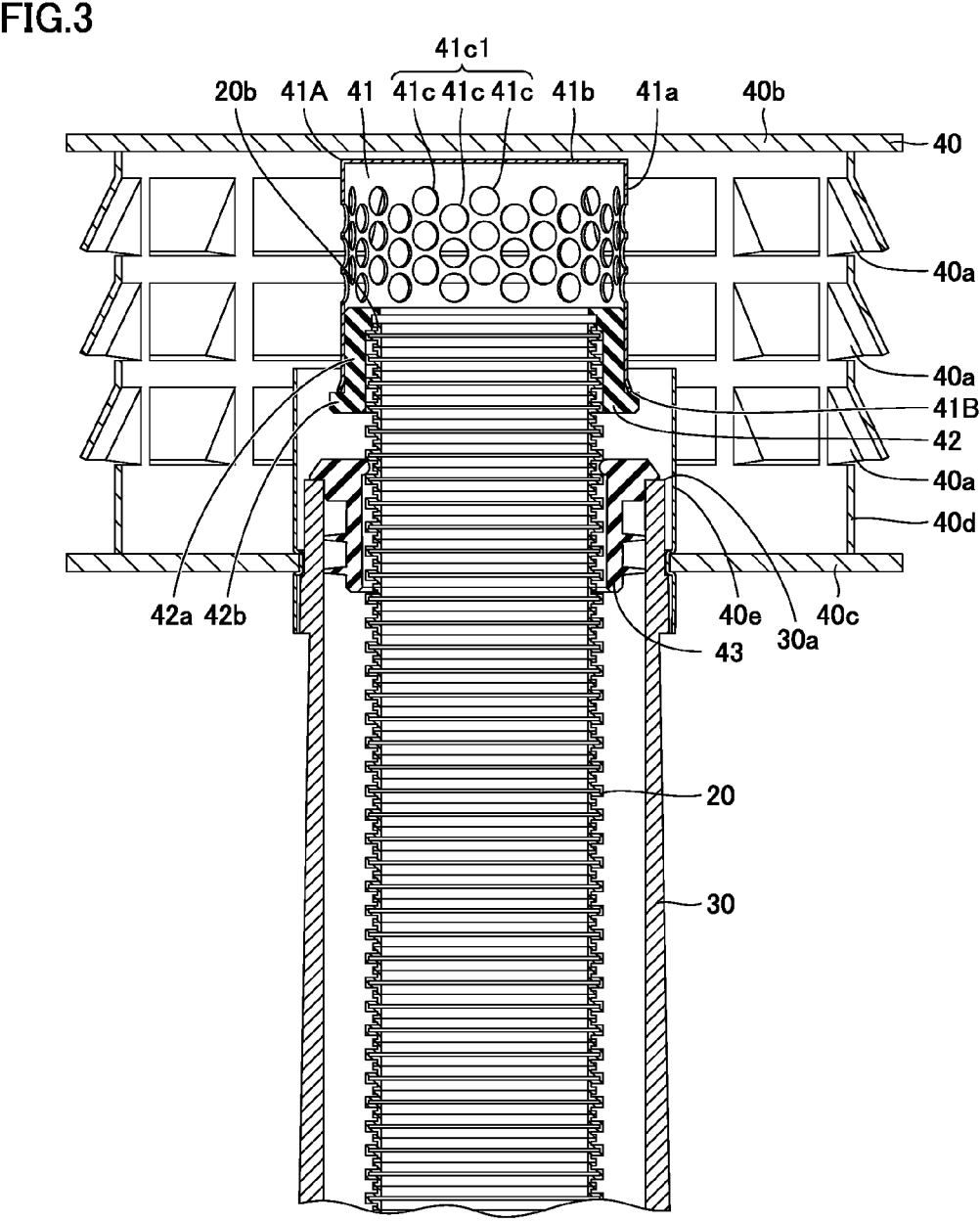
FIG. 3 is a cross-sectional view showing, in an enlarged manner, region I in FIG. 1.
Figure 22:
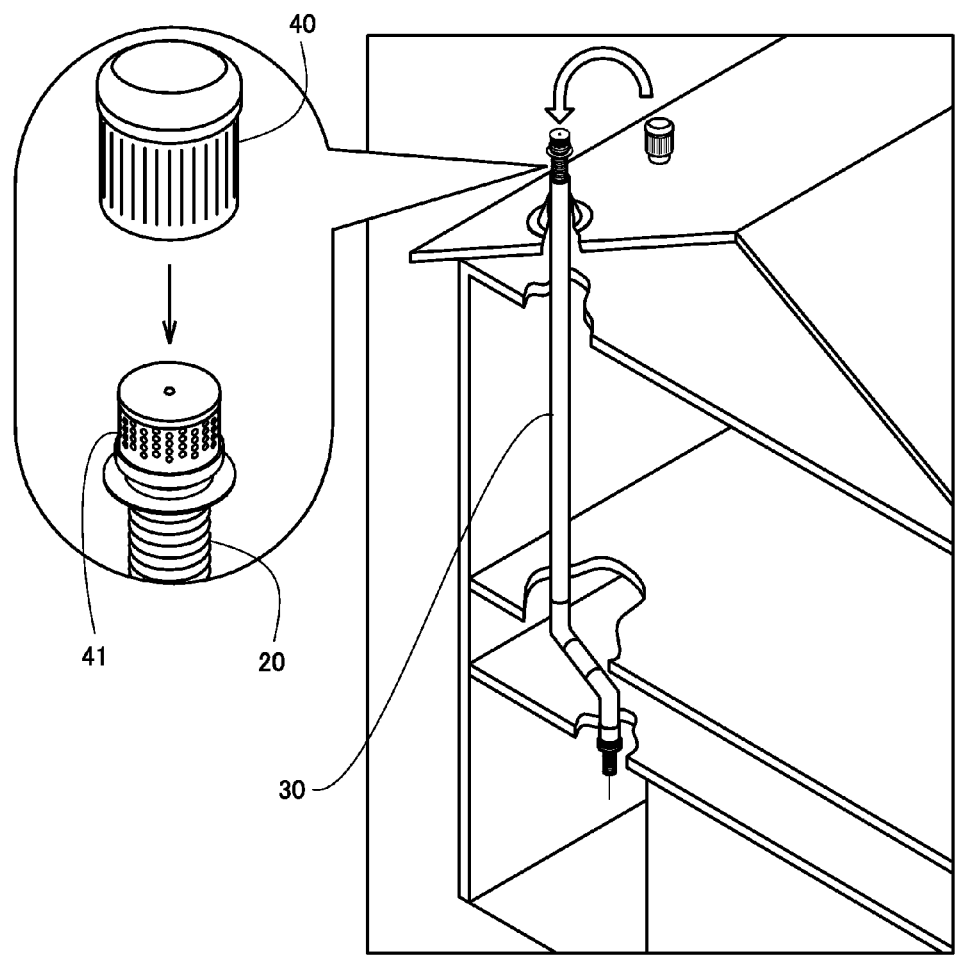
FIG. 22 is a schematic diagram for illustrating the operation step in the method of installing an exhaust tube, and the like, in one embodiment of the present invention.

Then, referring to FIG. 22, exhaust terminal 40 is attached to outside end portion 30a of exhaust pipe 30 on the outside of the building (see FIG. 3).

The steps so far after the first inside step correspond to the outside step in which an operation is performed on the outside of the building. After this outside step, the operator goes back into the building and performs the second inside step in which the operation is performed on the inside of the building again.

First, third package 303a of third member set 303 is unpacked, and the installation members used in the second inside step are prepared.

Furthermore, positioning marking carried out in the first inside step (see FIG. 14) is checked to confirm that slipping down or the like of exhaust tube 20 caused by release of fixation by exhaust adapter 43 does not occur after the inside step.

Figure 23:
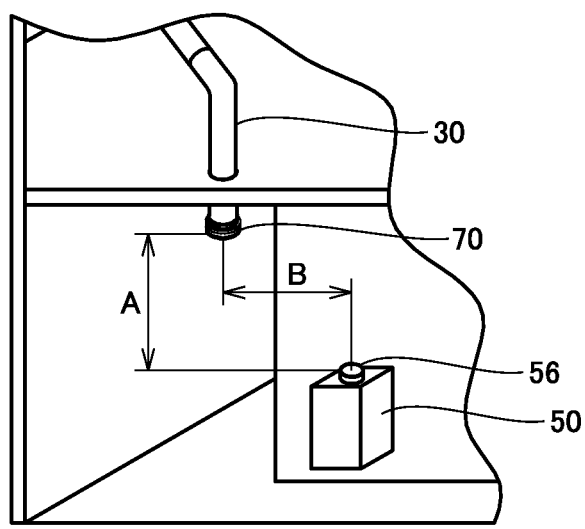
FIG. 23 is another schematic diagram for illustrating the operation step in the method of installing an exhaust tube, and the like, in one embodiment of the present invention.

Then, referring to FIG. 23, combustion apparatus 50 is placed on a wall surface or the like on the inside of building 200 such that a distance A in the vertical direction and a distance B in the horizontal direction each between the lower end of fixing member 70 and the exhaust vent (the upper end of exhaust connection pipe 56) of combustion apparatus 50 fall within a prescribed range. This is for the purpose of suppressing damage and the like to devices that are caused by a large tension applied to the connection portion between fixing member 70 or exhaust tube 20 and the exhaust vent of the water heater, and also for the purpose of ensuring an appropriate downhill inclination of exhaust tube 20 to suppress defects such as increased exhaust resistance within exhaust tube 20 caused by accumulation of drainage water and the like in exhaust tube 20.

In this case, binding band 71 of fixing member 70 may be tightened to squeeze the outer circumferential surface of first fixing portion 70a with the force stronger than that in the case of temporal fixation in the first inside step, to thereby firmly fix exhaust tube 20 such that exhaust tube 20 cannot be moved relative to exhaust pipe 30.

Then, referring to FIG. 24(a), a retaining ring 83 is set in a recess 82a of exhaust tube adapter 82 (see FIG. 24(b)), and exhaust tube adapter 82 is inserted into elbow tube 81. The central axis of elbow tube 81 is bent at an angle of 45°.

Figure 25:
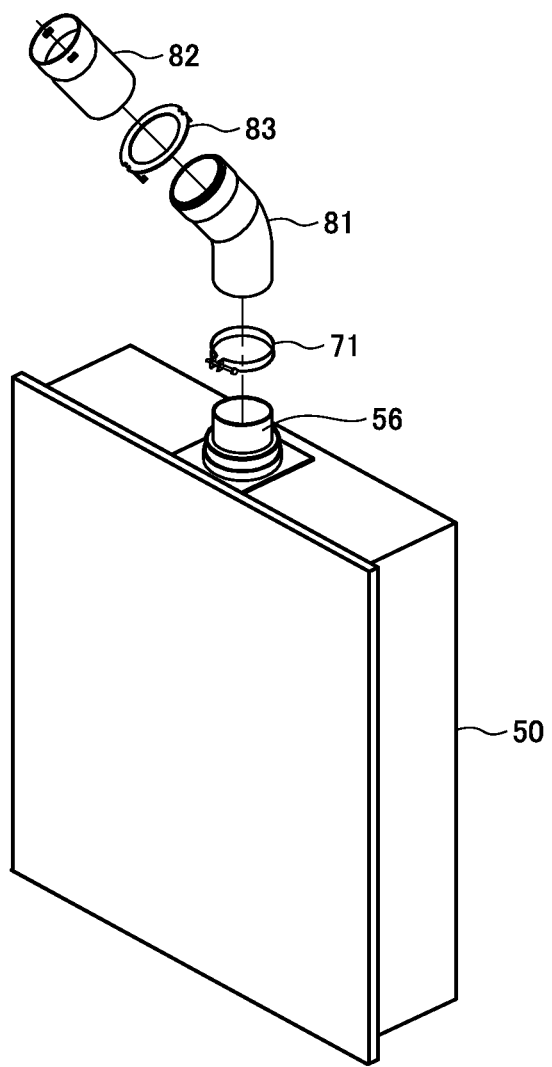
FIG. 25 is another schematic diagram for illustrating the operation step in the method of installing an exhaust tube, and the like, in one embodiment of the present invention.

Then, referring to FIG. 25, elbow tube 81 having exhaust tube adapter 82 and retaining ring 83 attached thereto is inserted into the exhaust vent (the upper end of exhaust connection pipe 56) of combustion apparatus 50, tightened by binding band 71 and temporarily fixed.

Figure 26:
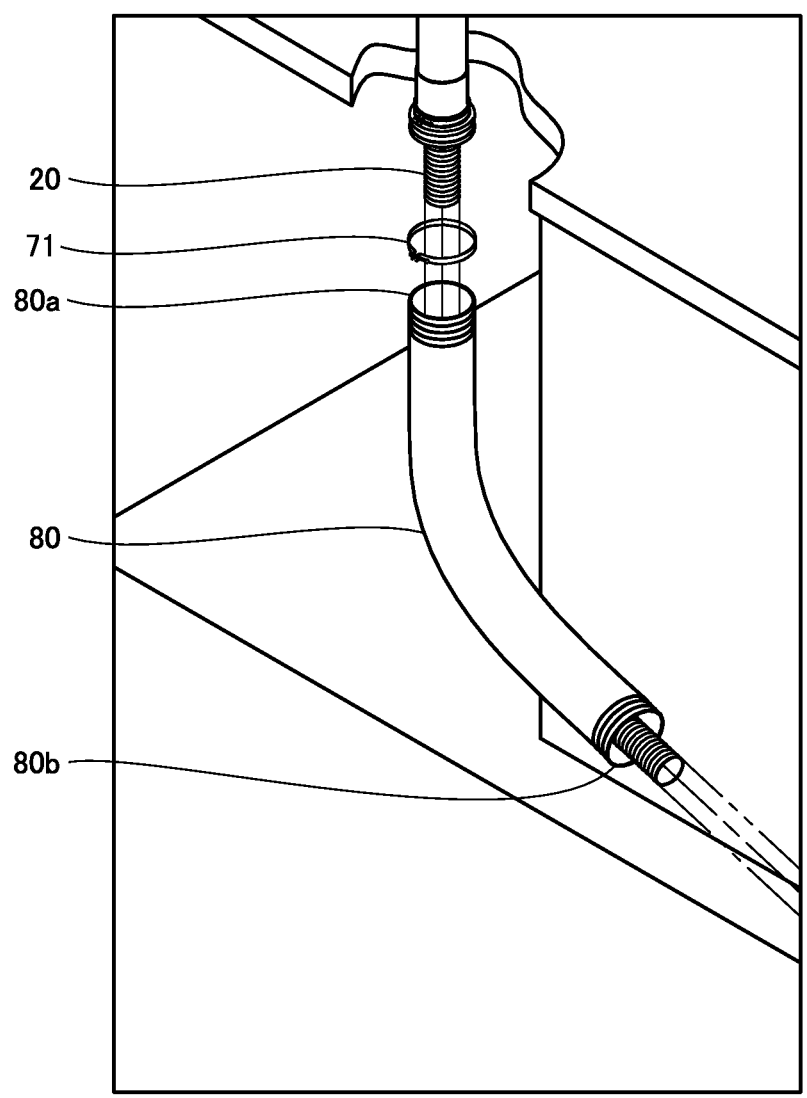
FIG. 26 is another schematic diagram for illustrating the operation step in the method of installing an exhaust tube, and the like, in one embodiment of the present invention.

Then, referring to FIG. 26, protection tube 80 is pushed in from the rear end portion side of exhaust tube 20 such that exhaust tube 20 passes through protection tube 80. Protection tube 80 is pushed in until tip end portion 80a of protection tube 80 reaches fixing member 70. At this time, it is checked whether exhaust tube 20 protrudes or not from rear end portion 80b of protection tube 80. If exhaust tube 20 does not protrude, protection tube 80 is cut to such a length that exhaust tube 20 protrudes.

Figure 4:
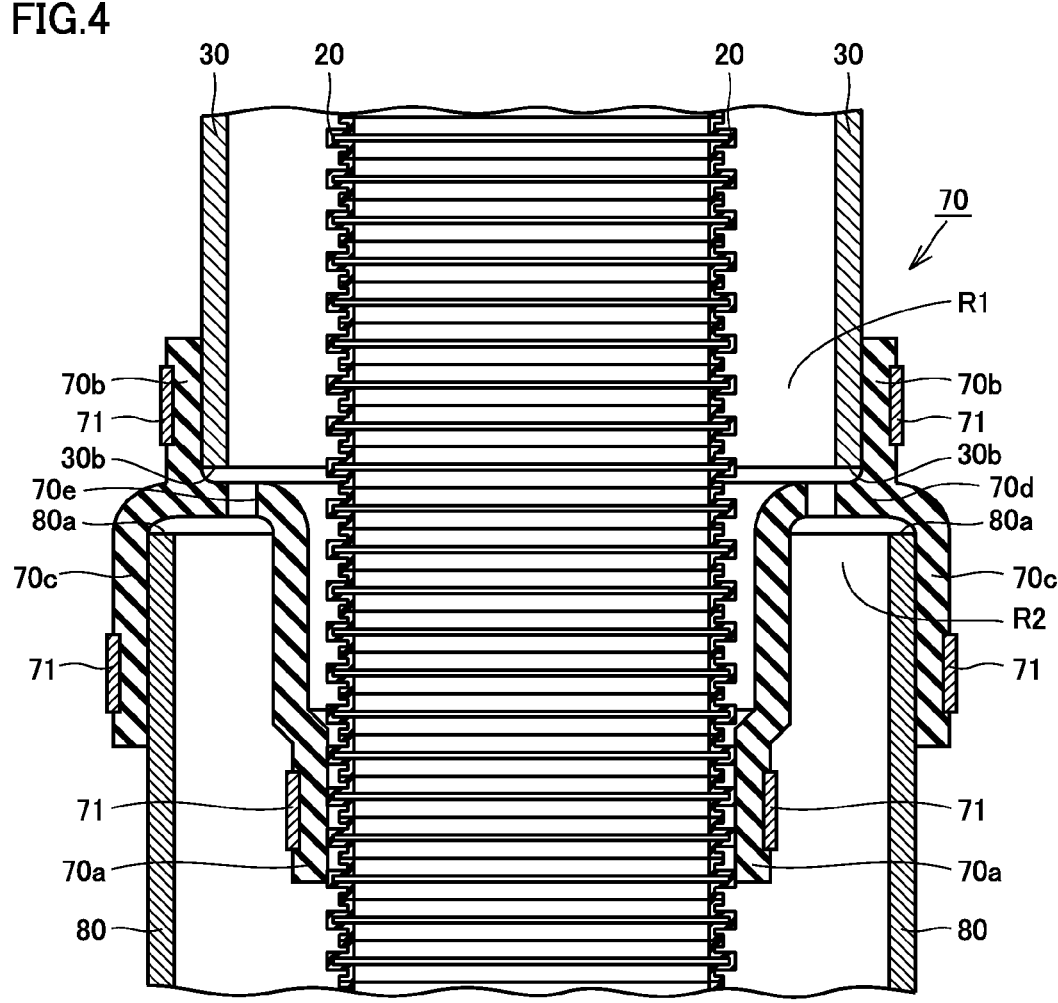
FIG. 4 is a cross-sectional view showing, in an enlarged manner, a region II in FIG. 1.

Then, tip end portion 80a of protection tube 80 is inserted toward fixing member 70 such that a part of protection tube 80 on the tip end portion 80a side is inserted through a cylindrical through hole of third fixing portion 70c in fixing member 70 (see FIG. 4). Then, binding band 71 is tightened to squeeze the outer circumferential surface of third fixing portion 70c (see FIG. 4), to thereby firmly fix protection tube 80 to fixing member 70.

Figure 27:
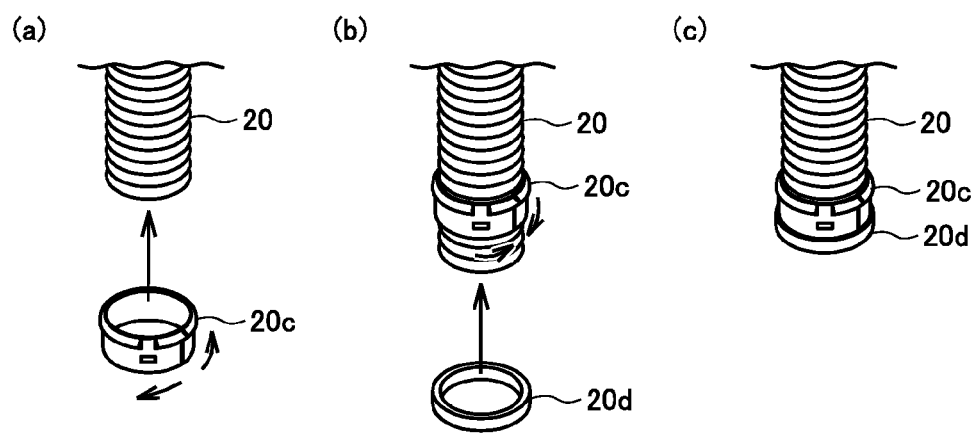
FIG. 27 is another schematic diagram for illustrating the operation step in the method of installing an exhaust tube, and the like, in one embodiment of the present invention.

Then, referring to FIG. 27, connection member for exhaust tube adapter 20c and gasket 20d are attached to rear end portion 20b of exhaust tube 20. Specifically, referring to FIG. 27(a), connection member for exhaust tube adapter 20c is pushed in from rear end portion 20b of exhaust tube 20, to cause exhaust tube 20 to pass through the through hole of connection member for exhaust tube adapter 20c. Connection member for exhaust tube adapter 20c is pushed in while it is bi-directionally rotated. Then, referring to FIGS. 27(b) and 27(c), gasket 20d is fitted around rear end portion 20b of exhaust tube 20, and connection member for exhaust tube adapter 20c is moved so as to come into contact with gasket 20d while it is bi-directionally rotated.

Figure 28:
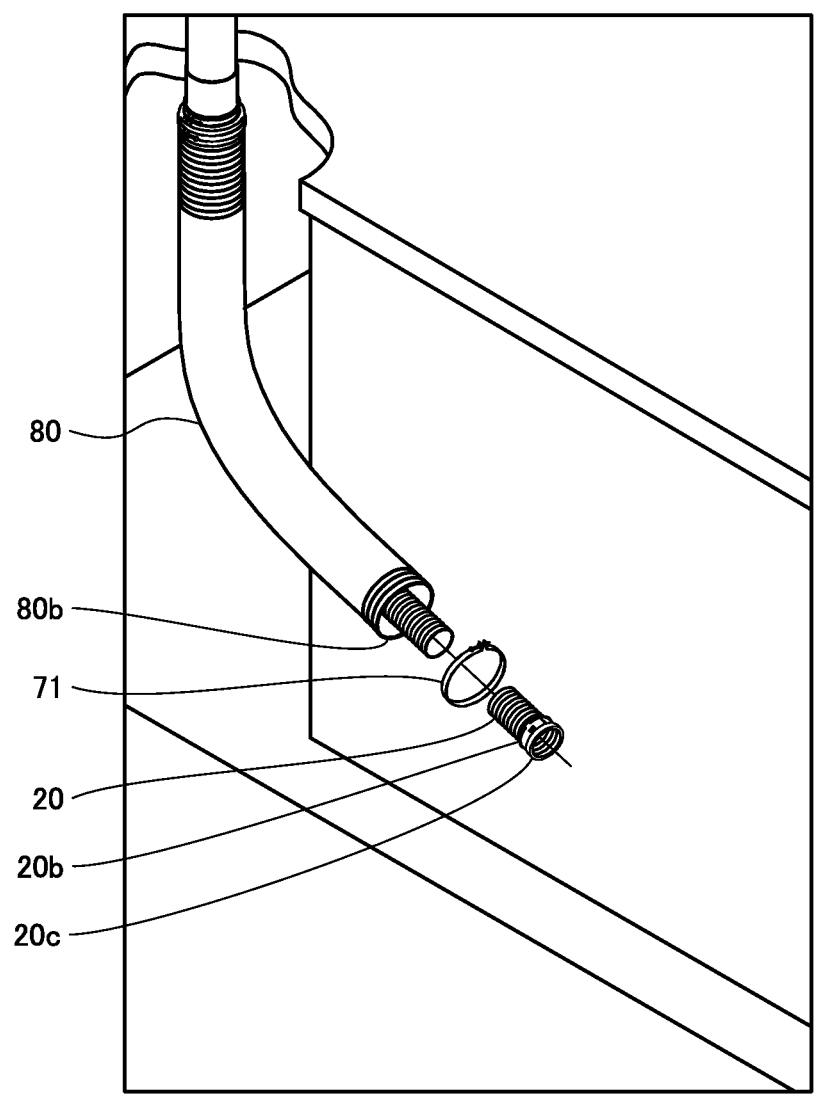
FIG. 28 is another schematic diagram for illustrating the operation step in the method of installing an exhaust tube, and the like, in one embodiment of the present invention.
Figure 29:
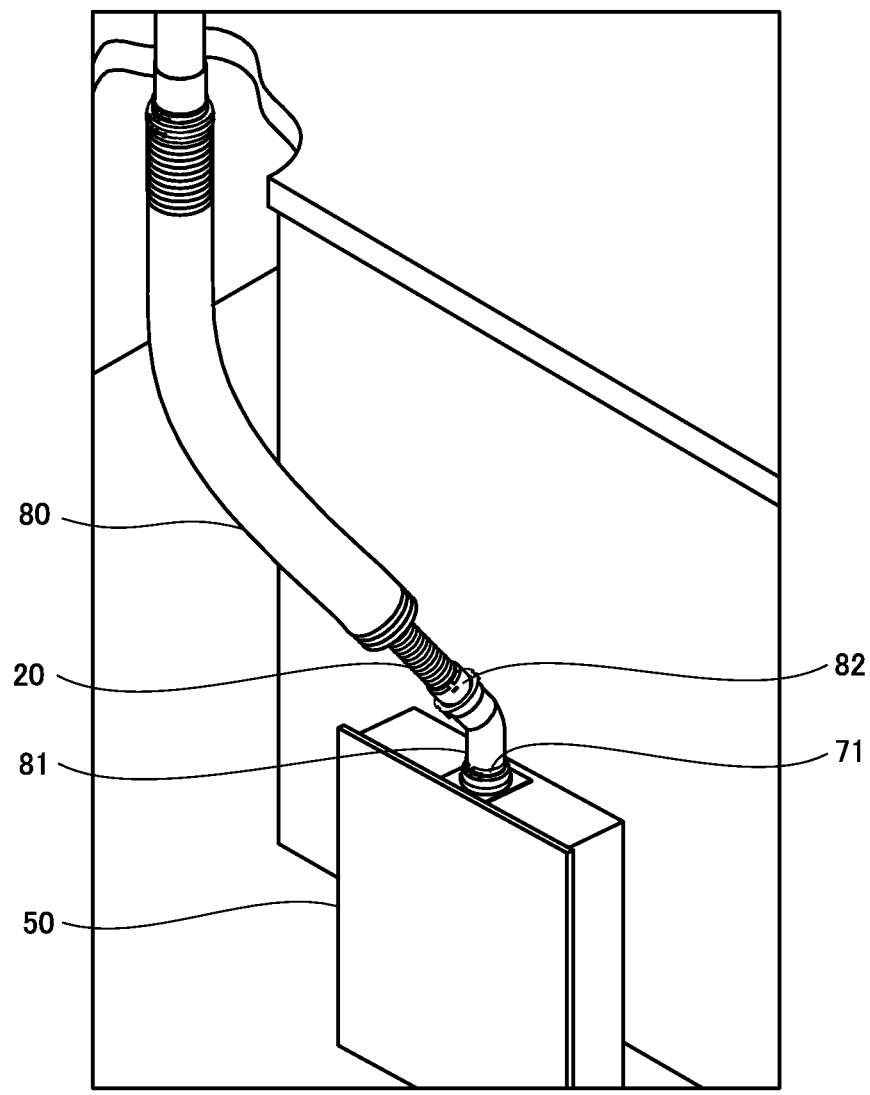
FIG. 29 is another schematic diagram for illustrating the operation step in the method of installing an exhaust tube, and the like, in one embodiment of the present invention.

Then, referring to FIG. 28, rear end portion 20b of exhaust tube 20 having connection member for exhaust tube adapter 20c attached thereto is caused to pass through binding band 71. Then, referring to FIG. 29, connection member for exhaust tube adapter 20c is inserted into exhaust tube adapter 82 to connect exhaust tube adapter 82 and exhaust tube 20. Then, elbow tube 81 inserted into the exhaust vent of combustion apparatus 50 is further tightened by binding band 71, and fixed in a full-scale manner.

Figure 30:
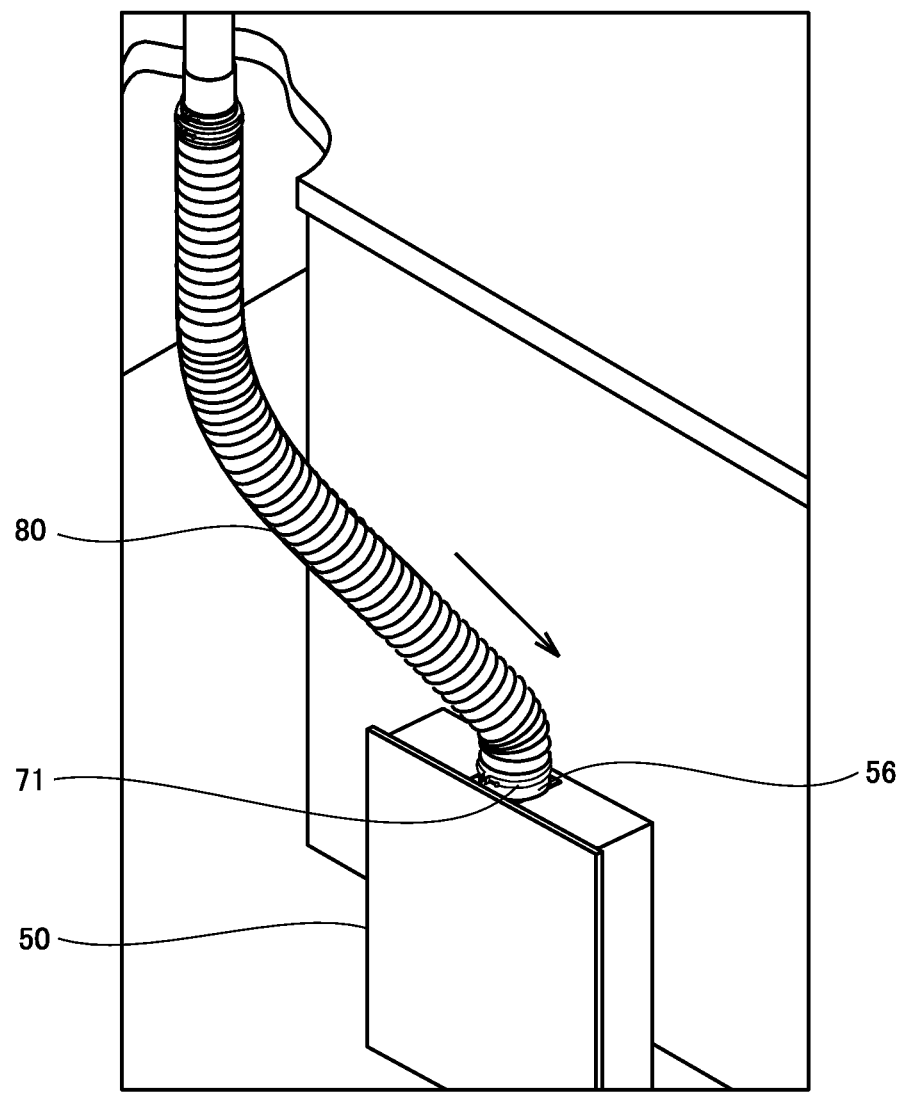
FIG. 30 is another schematic diagram for illustrating the operation step in the method of installing an exhaust tube, and the like, in one embodiment of the present invention.

Then, referring to FIG. 30, protection tube 80 as an accordion pipe is extended, and rear end portion 80b of protection tube 80 is fitted on exhaust connection pipe 56 of combustion apparatus 50. Then, protection tube 80 is fixed to combustion apparatus 50 by tightening of binding band 71.

Figure 31:
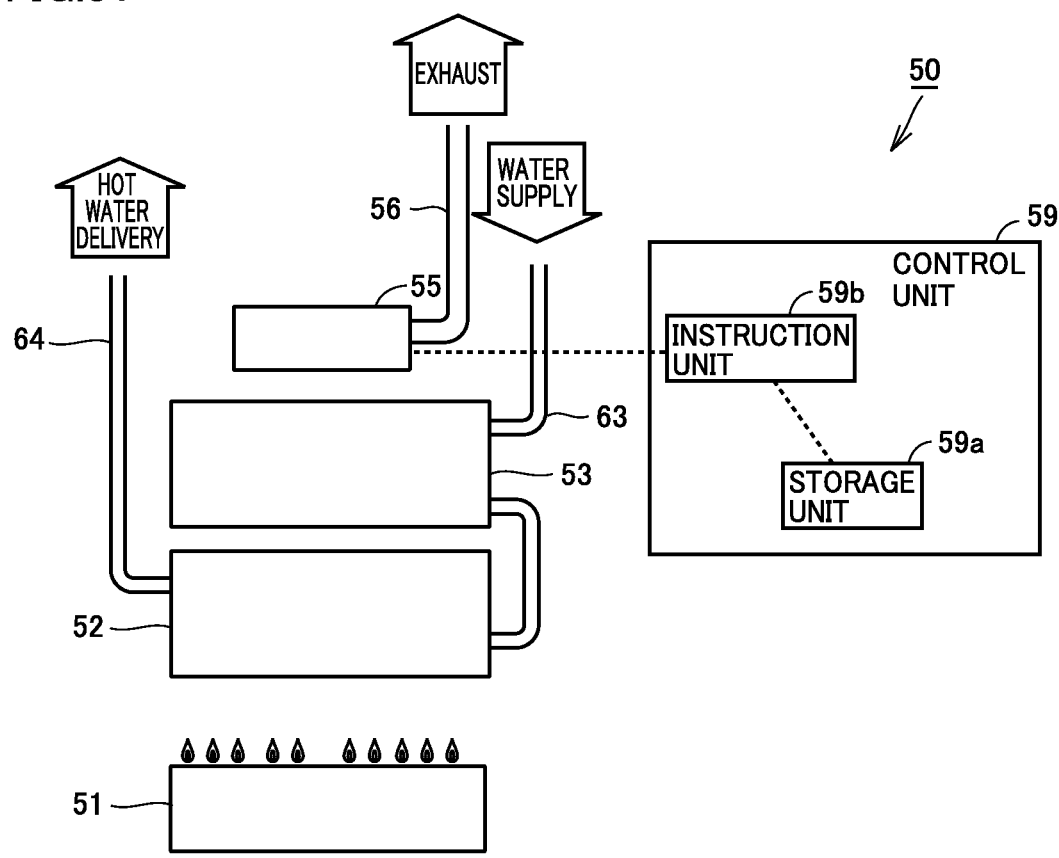
FIG. 31 is another schematic diagram for illustrating the operation step in the method of installing an exhaust tube, and the like, in one embodiment of the present invention.

Then, referring to FIG. 31, combustion apparatus 50 of the present embodiment includes a control unit 59 for controlling the air-blowing capability of fan 55 (the rotation speed of rotor 55a). Control unit 59 is formed of a microcomputer and an HIC (Hybrid Integrated Circuit), for example. A storage unit 59a can store the control constant and the like of the air-blowing capability of fan 55 in accordance with the length of exhaust tube 20. An instruction unit 59b is connected to fan 55. Based on the control constant and the like stored in storage unit 59a, control unit 59 can cause instruction unit 59b to send an instruction to fan 55 and control the air-blowing capability of fan 55.

The control constant and the like of the air-blowing capability of fan 55 in accordance with the length of installed exhaust tube 20 are stored in such storage unit 59a of control unit 59, so that the setting of the air-blowing capability of fan 55 can be changed. Specifically, for example, the setting is changed such that the air-blowing capability of fan 55 is increased as the length of installed exhaust tube 20 is increased. In addition, the setting may be changed in several stages in accordance with the length of exhaust tube 20 by a DIP switch (not shown) connected to control unit 59. Furthermore, for maintaining a more appropriate combustion state, it is preferable to use a similar control unit to change not only the air-blowing capability of fan 55 but also the settings of the amount of fuel gas to be supplied to burner 51 and the number of combustion tubes to be used.

In addition, the length of the installed exhaust tube 20 can be calculated from the initial length of exhaust tube 20 at the time when it is housed in first member set 301 and from the length of exhaust tube 20 remaining after installation.

Then, the functions and effects of the present embodiment will be described.

In the method of installing exhaust tube 20 of the present embodiment, exhaust tube 20 is installed utilizing the already-placed exhaust pipe 30 by inserting a new exhaust tube 20 into this exhaust pipe 30. Accordingly, exhaust tube 20 can be installed by a small number of operators in a short period of time without having to provide an opening in a building.

Furthermore, in the method of installing exhaust tube 20 of the present embodiment, exhaust tube 20 is installed according to the procedure of: performing, on the inside of the building, an operation of inserting a new exhaust tube 20 into the already-placed exhaust pipe 30; performing, on the outside of the building, an operation of fixing the inserted exhaust tube 20 to exhaust pipe 30; and performing, on the inside of the building, an operation of connecting the fixed exhaust tube 20 to the exhaust vent of combustion apparatus 50. Furthermore, the first inside step further includes, after the step of inserting exhaust tube 20 into exhaust pipe 30, the step of temporarily fixing exhaust tube 20 to inside end portion 30b of exhaust pipe 30 by fixing member 70 so as to prevent slipping down of exhaust tube 20 by its self weight. If exhaust tube 20 slips down before exhaust tube 20 is fixed to outside end portion 30a of exhaust pipe 30 in the outside step, the operation of pushing up exhaust tube 20 on the inside of the building is again required, thereby increasing the operation time and also making it difficult for a single operator to perform the operation alone. Accordingly, by temporarily fixing exhaust tube 20 so as not to slip down, it becomes possible to suppress an increase in the operation time and allow a single operator to readily perform the operation.

Furthermore, in the step of temporarily fixing exhaust tube 20, exhaust tube 20 may be temporarily fixed by fixing member 70 such that exhaust tube 20 can be moved relative to exhaust pipe 30 at the time when a prescribed amount or more of external force is applied. In the case where exhaust tube 20 is temporarily fixed so as not to be moved relative to exhaust pipe 30, if tip end portion 20a of exhaust tube 20 does not protrude from outside end portion 30a of exhaust pipe 30 in the outside step or if the length of exhaust tube 20 protruding from exhaust pipe 30 is insufficient in the outside step, the operator needs to go back into the building again to perform an operation of disengaging exhaust tube 20 and pushing up exhaust tube 20, so that the operation time is to be prolonged. Accordingly, by temporarily fixing exhaust tube 20 so as to be movable relative to exhaust pipe 30, the operator does not have to go back into the building but pulls up exhaust tube 20 from the outside of the building, so that the tip end portion of exhaust tube 20 can be set at an appropriate position.

Furthermore, in the method of installing exhaust tube 20 according to the present embodiment, in the step of inserting exhaust tube 20 into exhaust pipe 30, exhaust tube 20 is inserted into exhaust pipe 30 until the tip end portion of exhaust tube 20 reaches the outside of the building. Accordingly, the operator does not have to go back into the building but pulls up exhaust tube 20 from the outside of the building, so that tip end portion 20a of exhaust tube 20 can be set at an appropriate position.

Furthermore, in the method of installing exhaust tube 20 according to the present embodiment, the first inside step further includes, before the step of inserting exhaust tube 20 into exhaust pipe 30, the step of attaching insertion jig 21 to tip end portion 20a of exhaust tube 20. Insertion jig 21 has protruding portion 21b curved convexly. In the state where insertion jig 21 is attached to exhaust tube 20, protruding portion 21b protrudes to a side opposite to exhaust tube 20 and covers an opening on the tip end portion 20a side of exhaust tube 20. Accordingly, when insertion jig 21 is fixed to exhaust tube 20 and inserted into exhaust pipe 30, tip end portion 20a of exhaust tube 20 is less likely to get caught in the inner circumferential surface of exhaust pipe 30, so that the frictional resistance between insertion jig 21 and the inner circumferential surface of exhaust pipe 30 can be reduced. Accordingly, exhaust tube 20 having insertion jig 21 fixed thereto can be smoothly pushed into exhaust pipe 30. Therefore, exhaust tube 20 can be readily inserted into exhaust pipe 30. Furthermore, since protruding portion 21b of insertion jig 21 covers an opening on the tip end portion 20a side of exhaust tube 20, entry of foreign substances into exhaust tube 20 through the opening on the tip end portion 20a side of exhaust tube 20 can be suppressed.

Furthermore, in the method of installing exhaust tube 20 according to the present embodiment, before the first inside step, outside end portion 30a of exhaust pipe 30 is equipped with exhaust terminal 40 including: a cylindrical circumferential wall 40d having exhaust port 40a through which combustion gas is emitted to the outside; and ceiling wall 40b that closes one end of circumferential wall 40d. Accordingly, the combustion gas guided through exhaust tube 20 can be emitted through exhaust port 40a of exhaust terminal 40 to the outside of the building, and also, entry of rainwater and the like into combustion apparatus 50 through exhaust tube 20 can be prevented.

Furthermore, in the case where exhaust terminal 40 is attached to exhaust pipe 30, the outside step further includes the steps of: removing exhaust terminal 40 from exhaust pipe 30 before the step of fixing exhaust tube 20; and attaching exhaust terminal 40 to outside end portion 30a of exhaust pipe 30 after the step of fixing exhaust tube 20. Accordingly, in the outside step, it becomes possible to perform an operation of fixing exhaust tube 20 to outside end portion 30a of exhaust pipe 30, an operation of adjusting the position of tip end portion 20a of exhaust tube 20, and the like.

In this case, the outside step further includes, after the step of removing exhaust terminal 40 and before the step of attaching exhaust terminal 40, the step of adjusting the length of exhaust tube 20 that protrudes from outside end portion 30a of exhaust pipe 30 so as to fit to the shape of exhaust terminal 40. Accordingly, the length of exhaust tube 20 protruding from exhaust pipe 30 can be optimized in accordance with exhaust terminals 40 having various shapes for each type. Consequently, it becomes possible to suppress defects such as an increase in exhaust resistance occurring in the case where tip end portion 20a of exhaust tube 20 is not set at an appropriate position.

Furthermore, in the case where exhaust terminal 40 is attached to exhaust pipe 30, the outside step further includes, after the step of fixing exhaust tube 20, the step of attaching exhaust straightening member 41 to tip end portion 20a of exhaust tube 20. Exhaust straightening member 41 includes: a circumferential wall portion 41a having a cylindrical shape and a plurality of openings 41c through which combustion gas is caused to flow out toward exhaust port 40a of exhaust terminal 40; and a cover portion 41b that closes one end of circumferential wall portion 41a. By causing the combustion gas to flow out through the plurality of openings 41c provided in circumferential wall portion 41a of exhaust straightening member 41, the combustion gas can readily be emitted from exhaust port 40a of exhaust terminal 40. Furthermore, since one end of circumferential wall portion 41a of exhaust straightening member 41 is closed by cover portion 41b, combustion gas is less likely to come into contact with the ceiling wall of exhaust terminal 40. Therefore, dew condensation and drainage water produced when combustion gas comes into contact with the ceiling wall of exhaust terminal 40 can be suppressed. In addition, exhaust straightening member 41 is disposed within exhaust terminal 40. Accordingly, even if the combustion gas comes into contact with cover portion 41b of exhaust straightening member 41, production of drainage water is suppressed as compared with the case where combustion gas comes into contact with ceiling wall 40b of exhaust terminal 40.

Furthermore, in the method of installing exhaust tube 20 according to the present embodiment, the second inside step further includes, before the step of connecting rear end portion 20b of exhaust tube 20 and the exhaust vent of combustion apparatus 50, the step of adjusting the length of exhaust tube 20 protruding from inside end portion 30b of exhaust pipe 30 in accordance with the distance between inside end portion 30b of exhaust pipe 30 and the exhaust vent of combustion apparatus 50. Accordingly, it becomes possible to suppress defects such as an increase in exhaust resistance caused by accumulation of drainage water and the like resulting from slack in the exhaust tube.

Furthermore, in the method of installing exhaust tube 20 according to the present embodiment, the second inside step further includes the step of attaching protection tube 80 for protecting exhaust tube 20 extending from exhaust pipe 30 to combustion apparatus 50 (exhaust tube 20 protruding from inside end portion 30b of exhaust pipe 30). Accordingly, damage to exhaust tube 20 protruding from inside end portion 30b of exhaust pipe 30 can be suppressed. Also, even when exhaust tube 20 is broken, leakage of combustion gas into the building and dripping of drainage water and the like into the building can still be suppressed.

Protection tube 80 can expand and contract in the axial direction. The second inside step further includes the step of adjusting the length of protection tube 80 by causing protection tube 80 to expand or contract in accordance with the distance between exhaust pipe 30 and combustion apparatus 50. Accordingly, the length of protection tube 80 can readily be adjusted in accordance with the length of exhaust tube 20 protruding from inside end portion 30b of exhaust pipe 30.

Furthermore, in the method of installing exhaust tube 20 according to the present embodiment, combustion apparatus 50 includes burner 51 producing combustion gas and fan 55 that supplies air to burner 51. The second inside step further includes, after the step of connecting rear end portion 20b of exhaust tube 20 and the exhaust vent of combustion apparatus 50, the step of changing the setting of the air-blowing capability of fan 55 in accordance with the length of exhaust tube 20. By achieving an appropriate setting of the air-blowing capability of fan 55 in accordance with the length of exhaust tube 20, the amount of air and fuel gas supplied into combustion apparatus 50 and the exhaust amount of combustion gas can be optimized. Accordingly, it becomes possible to suppress faulty combustion caused by excess or deficiency of the supplied amount of air and fuel gas and the exhaust amount of combustion gas, so that the combustion efficiency can be improved.

Furthermore, the present embodiment is an installation member set including a plurality of installation members used in the method of installing exhaust tube 20 described above, and also relates to an installation member set including: first member set 301 having first package 301a and installation members housed in first package 301a and used in the first inside step; second member set 302 having second package 302a and installation members housed in second package 302a and used in the outside step; and third member set 303 having third package 303a and installation members housed in third package 303a and used in the second inside step.

According to the installation member set of the present embodiment, in the method of installing exhaust tube 20 described above, the installation members used in each step can be readily prepared and exhaust tube 20 can be installed in a shorter period of time.

The second package has a holding member for allowing second member set 302 to be held while both hands of the operator can be used in the outside step. Accordingly, in the outside step performed on a high place such as on the top of a roof, accidental dropping of the installation member by the operator can be suppressed without impairing safety and working efficiency. Consequently, the operation of collecting the dropped installation member can be eliminated, so that exhaust tube 20 can be installed in a shorter period of time.

Furthermore, the present embodiment also relates to a method of placing combustion apparatus 50, including the steps of: installing exhaust tube 20 using the method of installing exhaust tube 20 described above; and placing combustion apparatus 50 on the inside of the building. In the method of placing combustion apparatus 50 of the present embodiment, combustion apparatus 50 can be placed by a small number of operators in a short period of time by using the method of installing exhaust tube 20 described above.

Furthermore, the present embodiment is a method of replacing water heater (combustion apparatus 50) using the method of installing exhaust tube 20 described above, and also relates to a method of replacing water heater, including the steps of: removing hot water storage-type water heater 90 placed on the inside of the building; installing exhaust tube 20; and placing combustion apparatus 50 on the inside of the building. Combustion apparatus 50 is an instantaneous water heater. According to the method of replacing water heater of the present embodiment, water heater can be replaced in a short period of time by means of a small number of operators by using the method of installing exhaust tube 20 described above.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of installing an exhaust tube through which combustion gas produced in a combustion apparatus placed on an inside of a building is emitted to an outside of said building, said method comprising:
   a first inside step including the step of, by an operation on the inside of said building, inserting, from the inside of said building toward the outside thereof, an exhaust tube into an exhaust pipe already placed and leading from the inside of said building to the outside thereof;
   an outside step including the step of, by an operation on the outside of said building, fitting an exhaust adapter having an annular shape into a gap between an outer circumferential surface of said exhaust tube and an inner circumferential surface of said exhaust pipe to close said gap and fix said exhaust tube to said exhaust pipe; and
   a second inside step including the step of, by an operation on the inside of said building, connecting a rear end portion of said exhaust tube and an exhaust vent of said combustion apparatus,
   said first inside step, said outside step and said second inside step being performed in this order, wherein
   said first inside step further includes, after the step of inserting said exhaust tube into said exhaust pipe, the step of temporarily fixing said exhaust tube to said exhaust pipe by a fixing member so as to prevent said exhaust tube from slipping down by a self weight.

2. The method of installing an exhaust tube according to claim 1, wherein, in the step of temporarily fixing said exhaust tube, said exhaust tube is temporarily fixed by said fixing member such that said exhaust tube can be moved relative to said exhaust pipe when a prescribed amount or more of external force is applied.

3. A method of installing an exhaust tube through which combustion gas produced in a combustion apparatus placed on an inside of a building is emitted to an outside of said building, said method comprising:
a first inside step including the step of, by an operation on the inside of said building, inserting, from the inside of said building toward the outside thereof, an exhaust tube into an exhaust pipe already placed and leading from the inside of said building to the outside thereof;
an outside step including the step of, by an operation on the outside of said building, fitting an exhaust adapter having an annular shape into a gap between an outer circumferential surface of said exhaust tube and an inner circumferential surface of said exhaust pipe to close said gap and fix said exhaust tube to said exhaust pipe; and
a second inside step including the step of, by an operation on the inside of said building, connecting a rear end portion of said exhaust tube and an exhaust vent of said combustion apparatus,
said first inside step, said outside step and said second inside step being performed in this order, wherein
before said first inside step, an outside end portion of said exhaust pipe located on the outside of said building is provided with an exhaust terminal including at least an exhaust port through which said combustion gas is emitted to outside, and a ceiling wall, and
said outside step further includes the steps of:
removing said exhaust terminal from said exhaust pipe before the step of fixing said exhaust tube; and
attaching said exhaust terminal to said outside end portion of said exhaust pipe after the step of fixing said exhaust tube.

4. The method of installing an exhaust tube according to claim 3, wherein said outside step further includes, after the step of removing said exhaust terminal and before the step of attaching said exhaust terminal, the step of adjusting a length of the exhaust tube protruding from said outside end portion of said exhaust pipe so as to fit to a shape of said exhaust terminal.

5. A method of installing an exhaust tube through which combustion gas produced in a combustion apparatus placed on an inside of a building is emitted to an outside of said building, said method comprising:
a first inside step including the step of, by an operation on the inside of said building, inserting, from the inside of said building toward the outside thereof, an exhaust tube into an exhaust pipe already placed and leading from the inside of said building to the outside thereof;
an outside step including the step of, by an operation on the outside of said building, fitting an exhaust adapter having an annular shape into a gap between an outer circumferential surface of said exhaust tube and an inner circumferential surface of said exhaust pipe to close said gap and fix said exhaust tube to said exhaust pipe; and
a second inside step including the step of, by an operation on the inside of said building, connecting a rear end portion of said exhaust tube and an exhaust vent of said combustion apparatus,
said first inside step, said outside step and said second inside step being performed in this order, wherein
before said first inside step, an outside end portion of said exhaust pipe located on the outside of said building is provided with an exhaust terminal including at least an exhaust port through which said combustion gas is emitted to outside, and a ceiling wall, and
said outside step further includes, after the step of fixing said exhaust tube, the step of attaching, to said tip end portion of said exhaust tube, an exhaust straightening member including a circumferential wall portion having a cylindrical shape and a plurality of openings through which said combustion gas flows out toward said exhaust port of said exhaust terminal, and a cover portion that closes one end of said circumferential wall portion.

6. A method of installing an exhaust tube through which combustion gas produced in a combustion apparatus placed on an inside of a building is emitted to an outside of said building, said method comprising:
a first inside step including the step of, by an operation on the inside of said building, inserting, from the inside of said building toward the outside thereof, an exhaust tube into an exhaust pipe already placed and leading from the inside of said building to the outside thereof;
an outside step including the step of, by an operation on the outside of said building, fitting an exhaust adapter having an annular shape into a gap between an outer circumferential surface of said exhaust tube and an inner circumferential surface of said exhaust pipe to close said gap and fix said exhaust tube to said exhaust pipe; and
a second inside step including the step of, by an operation on the inside of said building, connecting a rear end portion of said exhaust tube and an exhaust vent of said combustion apparatus,
said first inside step, said outside step and said second inside step being performed in this order, wherein
said second inside step further includes the step of attaching a protection tube for protecting at least a part of said exhaust tube extending from said exhaust pipe to said combustion apparatus.

7. The method of installing an exhaust tube according to claim 6, wherein
said protection tube can expand and contract in an axial direction, and
said second inside step further includes the step of adjusting a length of said protection tube by causing said protection tube to expand or contract in accordance with a distance between said exhaust pipe and said combustion apparatus.

8. A method of installing an exhaust tube through which combustion gas produced in a combustion apparatus placed on an inside of a building is emitted to an outside of said building, said method comprising:
a first inside step including the step of, by an operation on the inside of said building, inserting, from the inside of said building toward the outside thereof, an exhaust tube into an exhaust pipe already placed and leading from the inside of said building to the outside thereof;
an outside step including the step of, by an operation on the outside of said building, fitting an exhaust adapter having an annular shape into a gap between an outer circumferential surface of said exhaust tube and an inner circumferential surface of said exhaust pipe to close said gap and fix said exhaust tube to said exhaust pipe; and a second inside step including the step of, by an operation on the inside of said building, connecting a rear end portion of said exhaust tube and an exhaust vent of said combustion apparatus, said first inside step, said outside step and said second inside step being performed in this order, wherein said combustion apparatus includes a burner producing combustion gas and a fan that supplies air to said burner, and said second inside step further includes, after the step of connecting said rear end portion of said exhaust tube and said exhaust vent of said combustion apparatus, the step of changing setting of an air-blowing capability of said fan in accordance with a length of said exhaust tube.

9. An installation member set including a plurality of installation members used in a method of installing an exhaust tube through which combustion gas produced in a combustion apparatus placed on an inside of a building is emitted to an outside of said building, said method comprising:

a first inside step including the step of, by an operation on the inside of said building, inserting, from the inside of said building toward the outside thereof, an exhaust tube into an exhaust pipe already placed and leading from the inside of said building to the outside thereof;

an outside step including the step of, by an operation on the outside of said building, fitting an exhaust adapter having an annular shape into a gap between an outer circumferential surface of said exhaust tube and an inner circumferential surface of said exhaust pipe to close said gap and fix said exhaust tube to said exhaust pipe; and a second inside step including the step of, by an operation on the inside of said building, connecting a rear end portion of said exhaust tube and an exhaust vent of said combustion apparatus, said first inside step, said outside step and said second inside step being performed in this order, said installation member set comprising:

a first member set having a first package and said installation members housed in said first package and used in said first inside step;

a second member set having a second package and said installation members housed in said second package and used in said outside step; and a third member set having a third package and said installation members housed in said third package and used in said second inside step.

10. The installation member set according to claim 9, wherein said second package has a holding member for allowing said second member set to be held in a state where both hands of an operator can be used in said outside step.

* * * * *